US007973973B2

(12) United States Patent
Nose et al.

(10) Patent No.: US 7,973,973 B2
(45) Date of Patent: Jul. 5, 2011

(54) DISPLAY DEVICE, DISPLAY PANEL DRIVER AND METHOD OF DRIVING DISPLAY PANEL

(75) Inventors: Takashi Nose, Kanagawa (JP); Hirobumi Furihata, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 895 days.

(21) Appl. No.: 11/798,578

(22) Filed: May 15, 2007

(65) Prior Publication Data

US 2007/0268524 A1 Nov. 22, 2007

(30) Foreign Application Priority Data

May 17, 2006 (JP) ................................. 2006-138132

(51) Int. Cl.
*H04N 1/40* (2006.01)

(52) U.S. Cl. ......... 358/3.01; 358/1.9; 345/690; 345/204

(58) Field of Classification Search ................. 358/3.01; 345/690, 204

See application file for complete search history.

(56) References Cited

U.S. PATENT DOCUMENTS

| | | | | |
|---|---|---|---|---|
| 5,481,317 | A | 1/1996 | Hieda | |
| 6,278,496 | B1 | 8/2001 | Kitagawa et al. | |
| 6,573,934 | B1 | 6/2003 | Lee | |
| 2004/0263495 | A1* | 12/2004 | Sugino et al. | 345/204 |
| 2005/0122287 | A1 | 6/2005 | Nishitani et al. | |
| 2006/0061842 | A1 | 3/2006 | Oka et al. | |
| 2006/0221259 | A1* | 10/2006 | Miyazawa et al. | 348/790 |
| 2006/0284899 | A1* | 12/2006 | Kimura | 345/690 |

FOREIGN PATENT DOCUMENTS

| | | |
|---|---|---|
| EP | 1 085 494 A1 | 3/2001 |
| GB | 2 400 765 A | 10/2004 |
| JP | 2-187788 | 7/1990 |
| JP | 07-281633 | 10/1995 |
| JP | 09-080378 | 3/1997 |
| JP | 9-247499 | 9/1997 |
| JP | 2001-296855 | 10/2001 |

OTHER PUBLICATIONS

European Search Report dated Sep. 14, 2007.
Kim, et al, "Optimal Piece Linear Segments of Gamma Correction for CMOS Image Sensors" IEICE Transactions on Electronics, Electronics Society, Tokyo, JP, vol. E88-C, No. 11, Nov. 2005, pp. 2090-2093.
Japanese Office Action dated Jun. 4, 2008 with Partial English Language Translation.
European Office Action dated Oct. 29,2010.

* cited by examiner

*Primary Examiner* — Twyler L Haskins
*Assistant Examiner* — Michael Burleson
(74) *Attorney, Agent, or Firm* — McGinn IP Law Group, PLLC

(57) ABSTRACT

An LCD device according to the present invention has: an LCD panel; an operation and correction circuit configured to perform a correction operation with respect to an input gray-scale data of a target frame image by using an arithmetic expression to generate an output gray-scale data; a data line driver configured to drive the LCD panel in accordance with the output gray-scale data; and a correction data calculation circuit configured to generate a correction data that specifies a relationship between the input gray-scale data and the output gray-scale data of the target frame image, depending on the input gray-scale data of the target frame image or an input gray-scale data of a precedent frame image followed by the target frame image. The operation and correction circuit determines coefficients of the arithmetic expression from the correction data.

22 Claims, 20 Drawing Sheets

DISPLAY DEVICE, DISPLAY PANEL DRIVER AND METHOD OF DRIVING DISPLAY PANEL

BACKGROUND OF THE INVENTION

1. Field of the Invention

The present invention relates to a display device and a method of driving a display panel. In particular, the present invention relates to a technique for desirably adjusting gray-scale on the display panel by performing a correction to a gray-scale data.

2. Description of Related Art

In recent years, a mobile terminal such as a mobile phone or a PDA (Personal Data Assistant) has been required to support a function of displaying movie. For example, a mobile phone supporting the digital terrestrial broadcasting is one of key products for a manufacturer of the mobile phone.

One problem is that a small LCD (Liquid Crystal Display) device of the mobile terminal is inferior in display quality of the movie, particularly in contrast characteristics at a time of when an image is not bright enough, as compared with a CRT (Cathode Ray Tube) or a big LCD device. In the LCD device of the mobile terminal, brightness of its back light is set low from a viewpoint of reduction of electric power consumption. As a result, when a movie is displayed, deterioration of picture quality is likely to occur due to insufficient contrast at the time when the image is not bright enough.

One method for improving display quality is to perform a correction operation, for example a gamma correction with respect to an input gray-scale data to enhance the contrast. Japanese Laid-Open Patent Application JP-H07-281633 (U.S. Pat. No. 3,201,449) discloses a technique to determine a gamma value depending on an APL (Average Picture Level) of the displayed image and variance (or standard deviation) of the brightness and to control the contrast by performing the gamma correction with the use of the determined gamma value. According to the technique described in the present patent document, when the gamma value is determined, a look-up table (LUT) in which input-output characteristics representing the gamma correction with the use of the determined gamma value are described is stored in a RAM. When an input gray-scale data is given, an output gray-scale data corresponding to the input gray-scale data is read out from the LUT, and thus the gamma correction is performed. Moreover, Japanese Laid-Open Patent Application JP-H09-80378 discloses a technique to perform a correction operation depending on the brightness of the back light and thereby to control the contrast of the image. According to the LCD device described in the present patent document, an LUT describing input-output characteristics with which a linear relationship between an input pixel data and an output pixel data can be obtained is prepared, and the correction operation is performed with the use of the LUT.

The inventors of the present application have recognized the following points. The LCD device performing the correction operation with respect to the image data is required to be small in its circuit size and low in electric power consumption. However, the LCD device performing the correction operation with the use of the LUT cannot meet such the requirement.

First, in the case of the LCD device performing the correction operation with the use of the LUT, it is necessary to prepare a high-capacity memory for storing the LUT, which causes increase in the circuit size. For example, in a case where the gamma correction is performed by using different gamma values for red (R), green (G) and blue (B), respectively, the input gray-scale data is of 6 bits and the output gray-scale data is of 8 bits, it is necessary to prepare an LUT whose size is 1536 bits ($=2^6\times8\times3$).

Furthermore, the LCD device performing the correction operation with the use of the LUT has a problem that the electric power consumption is large at a time when the relationship between the input gray-scale data and the output gray-scale curve in the correction operation is switched. That is, according to the LCD device performing the correction operation with the use of the LUT, it is necessary to rewrite the LUT in order to change the relationship between the input gray-scale data and the output gray-scale curve. However, a large amount of data transfer is necessary for rewriting the LUT. The large amount of data transfer causes increase in the electric power consumption, which is a problem particularly for the LCD device used in the mobile terminal.

As described above, in the display device configured to switch the relationship between the input gray-scale data and the output gray-scale curve in the correction operation depending on the image to be displayed, it is one important issue to achieve with a small circuit size and further to reduce the electric power consumption necessary for the switching.

SUMMARY

In one embodiment of the present invention, a display device has: a display panel; an operation and correction circuit configured to perform a correction operation with respect to an input gray-scale data of a target frame image by using an arithmetic expression to generate an output gray-scale data; a driver configured to drive the display panel in accordance with the output gray-scale data; and a correction data calculation circuit configured to generate a correction data. The correction data calculation circuit generates the correction data so as to specify a relationship between the input gray-scale data and the output gray-scale data of the target frame image, depending on the input gray-scale data of the target frame image or an input gray-scale data of a precedent frame image followed by the target frame image. The operation and correction circuit determines coefficients of the arithmetic expression from the correction data.

The present display device generates the correction data specifying the relationship between the input gray-scale data and the output gray-scale data depending on the frame image, and determines from the correction data the coefficients of the arithmetic expression used in the correction operation with respect to the input gray-scale data. That is to say, the present display device does not use the LUT in the correction operation, which reduces the circuit size effectively. In addition, the relationship between the input gray-scale data and the output gray-scale data is changed by switching the coefficients of the arithmetic expression due to the change of the correction data. Therefore, the display device of the present invention is capable of switching the relationship between the input gray-scale data and the output gray-scale data with a small amount of data transfer, which is effective in reducing the electric power consumption.

According to the present invention, it is possible to achieve with a small circuit size a display device configured to switch the relationship between the input gray-scale data and the output gray-scale curve in the correction operation depending on the image to be displayed. Furthermore, it is possible to reduce the electric power consumption necessary for the switching of the relationship.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

1. First Embodiment (Global Configuration)

Figure 1:
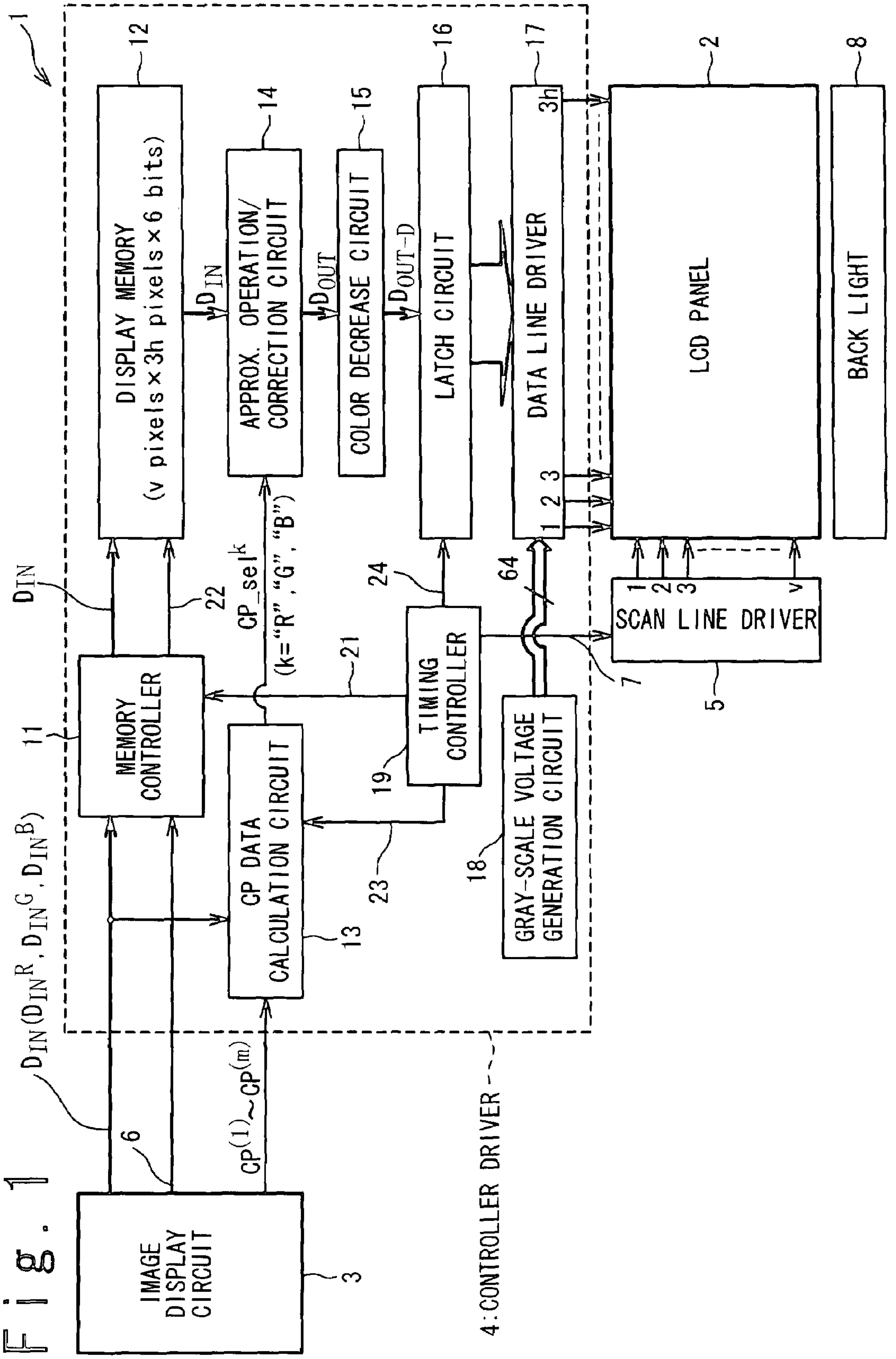
FIG. 1 is a block diagram showing a configuration of a liquid crystal display device according to a first embodiment of the present invention.

FIG. 1 is a block diagram showing a configuration of a system including a liquid crystal display (LCD) device 1 according to an embodiment of the present invention. The LCD device 1 is provided with an LCD panel 2, a controller driver 4, a scan line driver 5 and a back light 8 for illuminating the LCD panel 2. The LCD device 1 is configured to display an image on the LCD panel 2 in response to various data and control signals transmitted from an image display circuit 3.

The image display circuit 3 generates an input gray-scale data $D_{IN}$ corresponding to the image to be displayed on the LCD panel 2 and supplies it to the controller driver 4. In the present embodiment, the input gray-scale data $D_{IN}$ is a 6-bits data. The input gray-scale data $D_{IN}$ associated with a red pixel (R-pixel) of the LCD panel 2 may be hereinafter referred to as an input gray-scale data $D_{IN}^R$. Similarly, the input gray-scale data $D_{IN}$ associated with a green pixel (G-pixel) and a blue pixel (B-pixel) may be referred to as an input gray-scale data $D_{IN}^G$ and an input gray-scale data $D_{IN}^B$, respectively.

Furthermore, the image display circuit 3 generates a memory control signal 6 and correction point data sets $CP^{(1)}\sim^{(m)}$ used in controlling the controller driver 4, and supplies them to the controller driver 4. Each correction point data set $CP^{(i)}$ is a data specifying an input-output relation of a correction operation performed by the controller driver 4. In the present embodiment, each correction point data set $CP^{(i)}$ is a set of data for determining a shape of a gamma curve used in a gamma correction. Respective correction point data sets $CP^{(1)}\sim^{(m)}$ correspond to gamma values different from each other. Since the plurality of correction point data sets $CP^{(1)}\sim^{(m)}$ are supplied from the image display circuit 3, the controller driver 4 is capable of performing the gamma correction based on the plurality of gamma values γ. Each correction point data set $CP^{(i)}$ is composed of six correction point data: CP0 to CP5. A shape of a gamma curve corresponding to a gamma value γ is specified by one set of correction point data CP0 to CP5. The details of the correction point data set $CP^{(i)}$ will be described later. As for the image display circuit 3, for example, a CPU (Central Processing Unit) or a DSP (Digital Signal Processor) is used.

The LCD panel 2 has v scan lines (gate lines), 3*h* data lines (source lines) and v×3h pixels provided at intersections thereof; here, v and h are natural numbers.

The controller driver 4 receives the input gray-scale data $D_{IN}$ from the image display circuit 3, and drives the data lines (source lines) of the LCD panel 2 in accordance with the input gray-scale data $D_{IN}$. The controller driver 4 further has a function of generating a scan line driver control signal 7 to control the scan line driver 5. In the present embodiment, the controller driver 4 is integrated on a semiconductor chip different from a chip of the image display circuit 3.

The scan line driver 5 drives the scan lines (gate lines) of the LCD panel 2 in response to the scan line driver control signal 7.

The controller driver 4 is provided with a memory controller 11, a display memory 12, a correction point (CP) data calculation circuit 13, an approximate operation and correction circuit 14, a color decrease circuit 15, a latch circuit 16, a data line driver 17, a gray-scale voltage generation circuit 18 and a timing controller 19.

The memory controller 11 has functions of controlling the display memory 12 and writing the input gray-scale data $D_{IN}$ transmitted from the image display circuit 3 in the display memory 12. More specifically, the memory controller 11 controls the display memory 12 by generating a display memory control signal 22 based on the memory control signal 6 transmitted from the image display circuit 3 and a timing control signal 21 transmitted from the timing controller 19. Furthermore, the memory controller 11 transfers to the display memory 12 the input gray-scale data $D_{IN}$ which is transmitted from the image display circuit 3 in synchronization with the memory control signal 6, and writes the input gray-scale data $D_{IN}$ in the display memory 12.

The display memory 12 is used for temporarily holding the input gray-scale data $D_{IN}$ transmitted from the image display circuit 3 within the controller driver 4. The display memory 12 has a capacity corresponding to one frame image, namely, a capacity of v×3h×6 bits. In response to the display memory control signal 22 transmitted from the memory controller 11, the display memory 12 outputs in series the input gray-scale data $D_{IN}$ that is held. The output of the input gray-scale data $D_{IN}$ is carried out every one-line pixels of the LCD panel 2.

The correction point data calculation circuit 13 selects a desired correction point data set from the correction point data set $CP^{(1)}\sim^{(m)}$ received from the image display circuit 3, and supplies the selected correction point data set to the approximate operation and correction circuit 14. In the present embodiment, the correction point data sets are selected with regard to the R-pixel, the G-pixel and the B-pixel, respectively, in order that the gamma correction of respective input gray-scale data $D_{IN}$ of the R-pixel, the G-pixel and the B-pixel can be performed with using different gamma values. The correction point data set selected with respect to the R-pixel is referred to as a "selected correction point data set $CP\_sel^R$", the correction point data set selected with respect to the G-pixel is referred to as a "selected correction point data set $CP\_sel^G$", and the correction point data set selected with respect to the B-pixel is referred to as a "selected correction point data set $CP\_sel^B$". As in the correction point data set $CP^{(1)}\sim CP^{(m)}$, each of the selected correction point data sets $CP\_sel^R$, $CP\_sel^G$ and $CP\_sel^B$ is composed of the six correction point data: CP0 to CP5. The selected correction point data sets $CP\_sel^R$, $CP\_sel^G$ and $CP\_sel^B$ are collectively referred to as a selected correction point data set $CP\_sel^k$, when they are not distinguished from each other.

In the present embodiment, the correction point data calculation circuit 13 calculates the APL (Average Picture Level) of each frame image (or each field image) from the input gray-scale data $D_{IN}$, and selects the selected correction point data set $CP\_sel^k$ depending on (in accordance with) the calculated APL. Since the selected correction point data set $CP\_sel^k$ is selected depending on the APL, the gamma correction is performed with the use of a proper gamma value suitable for the frame image to be displayed, as will be described later.

The approximate operation and correction circuit 14 receives the selected correction point data set $CP\_sel^k$ from the correction point data calculation circuit 13, and performs the gamma correction with respect to the input gray-scale data $D_{IN}$ by using the gamma curve specified by the selected correction point data set $CP\_sel^k$ to generate an output gray-scale data $D_{OUT}$. More specifically, in accordance with the selected correction point data set $CP\_sel^R$, the approximate operation and correction circuit 14 performs the gamma correction with respect to the input gray-scale data $D_{IN}^R$ associated with the R-pixel to generate an output gray-scale data $D_{OUT}^R$. Similarly, in accordance with the selected correction point data sets $CP\_sel^G$ and $CP\_sel^B$, the approximate operation and correction circuit 14 performs the gamma correction with respect to the input gray-scale data $D_{IN}^G$ and $D_{IN}^B$ associated with the G-pixel and the B-pixel to generate output gray-scale data $D_{OUT}^G$ and $D_{OUT}^B$, respectively. The output gray-scale data $D_{OUT}$ is a collective term of the output gray-scale data $D_{OUT}^R$ associated with the R-pixel, the output gray-scale data $D_{OUT}^G$ associated with the G-pixel and the output gray-scale data $D_{OUT}^B$ associated with the B-pixel.

The output gray-scale data $D_{OUT}$ is an 8-bits data that has more bits than the input gray-scale data $D_{IN}$. To set the number of bits of the output gray-scale data $D_{OUT}$ larger than that of the input gray-scale data $D_{IN}$ is effective for avoiding lost of gray-scale information of the pixel due to the correction operation.

Used in the gamma correction performed by the approximate operation and correction circuit 14 is not the LUT (Look-Up Table) but an arithmetic expression. To eliminate the LUT from the approximate operation and correction circuit 14 is effective for reducing the circuit size of the approximate operation and correction circuit 14 and reducing the electric power consumption necessary for the switching of the gamma value. It should be noted that not an accurate expression but an approximate expression is used for the gamma correction performed by the approximate operation and correction circuit 14. The approximate operation and correction circuit 14 determines coefficients of the approximate expression used in the gamma correction from the selected correction point data set $CP\_sel^k$ transmitted from the correction point data calculation circuit 13, and thereby performs the gamma correction with the use of the desired gamma value. In order to perform the gamma correction with the use of the accurate expression, it is necessary to execute a power function calculation, which enlarges the circuit size. In the present embodiment, the gamma correction is performed with the use of the approximate expression that does not include any power function and thus the circuit size is reduced.

The color decrease circuit 15 performs a color decrease operation with respect to the output gray-scale data $D_{OUT}$ generated by the approximate operation and correction circuit 14, to generate a post-color-decrease output gray-scale data $D_{OUT\text{-}D}$.

The latch circuit 16 latches the post-color-decrease output gray-scale data $D_{OUT\text{-}D}$ from the color decrease circuit 15 in response to a latch signal 24, and transfers the latched post-color-decrease output gray-scale data $D_{OUT\text{-}D}$ to the data line driver 17.

In accordance with the post-color-decrease output gray-scale data $D_{OUT\text{-}D}$ transmitted from the latch circuit 16, the data line driver 17 drives the corresponding data lines of the LCD panel 2. More specifically, in accordance with the post-color-decrease output gray-scale data $D_{OUT\text{-}D}$, the data line driver 17 selects a corresponding gray-scale voltage from a plurality of gray-scale voltages supplied from the gray-scale voltage generation circuit 18, and drives the corresponding data lines of the LCD panel 2 to the selected gray-scale voltage. In the present embodiment, the number of the plurality of gray-scale voltages supplied from the gray-scale voltage generation circuit 18 is 64.

The timing controller 19 has a role of performing a timing control of the liquid crystal display device 1. More specifically, the timing controller 19 generates the scan line driver control signal 7, the timing control signal 21, a frame signal 23 and the latch signal 24, and supplies them to the scan line driver 5, the memory controller 11, the correction point data calculation circuit 13 and the latch circuit 16, respectively.

The scan line driver control signal 7 is a signal for controlling an operation timing of the scan line driver 5. The timing control signal 21 is a signal for controlling an operation timing of the memory controller 11. The above-mentioned display memory control signal 22 is generated in response to the timing control signal 21. The frame signal 23 is a signal for notifying the correction point data calculation circuit 13 of the start of each frame period. The frame signal 23 is activated at the start of each frame period. The latch signal 24 is a signal for allowing the latch circuit 16 to latch the post-color-decrease output gray-scale data $D_{OUT\text{-}D}$. Operation timings of the scan line driver 5, the memory controller 11, the correction point data calculation circuit 13 and the latch circuit 16 are controlled by the scan line driver control signal 7, the timing control signal 21, the frame signal 23 and the latch signal 24, respectively.

Next, the correction point data CP0 to CP5 of the correction point data set $CP^{(i)}$, the correction point data calculation circuit 13 and the approximate operation and correction circuit 14 will be explained below in detail.

(Method of Generating Correction Point Data CP0 to CP5 of Correction Point Data Set $CP^{(i)}$)

As described above, the correction point data CP0 to CP5 of the correction point data set $CP^{(i)}$ are a set of parameters that specify the shape of the gamma curve. The correction point data CP0 to CP5 of the correction point data set $CP^{(i)}$ corresponding to a certain gamma value γ are given by the following equation (1a) or (1b).

(1) In a case where the gamma value γ is smaller than 1:

$$CP0 = 0, \quad CP1 = \frac{4\cdot \text{Gamma}[K/4] - \text{Gamma}[K]}{2}, \quad CP2 = \text{Gamma}[K-1], \quad CP3 = \text{Gamma}[K], \quad CP4 = 2\cdot\text{Gamma}[(D_{IN}^{MAX} + K - 1)/2] - D_{OUT}^{MAX}, \quad CP5 = D_{OUT}^{MAX}. \tag{1a}$$

(2) In a case where the gamma value γ is equal to or larger than 1

$$CP0=0, \quad CP1=2\cdot\text{Gamma}[K/2]-\text{Gamma}[K], \quad CP2=\text{Gamma}[K-1], \quad CP3=\text{Gamma}[K], \quad CP4=2\cdot\text{Gamma}[(D_{IN}^{MAX}+K-1)/2]-D_{OUT}^{MAX}, \quad CP5=D_{OUT}^{MAX}. \tag{1b}$$

Here, $D_{IN}^{MAX}$ is the maximum value of the input gray-scale data $D_{IN}$, and $D_{OUT}^{MAX}$ is the maximum value of the output gray-scale data $D_{OUT}$. The parameter K is a constant given by the following equation (2):

$$K=(D_{IN}^{MAX}+1)/2, \tag{2}$$

The function Gamma[x] is a function representing the accurate expression of the gamma correction and is defined by the following equation (3):

$$\text{Gamma}[x]=D_{OUT}^{MAX}\cdot(x/D_{IN}^{MAX})^{\gamma}, \tag{3}$$

Figure 4A:
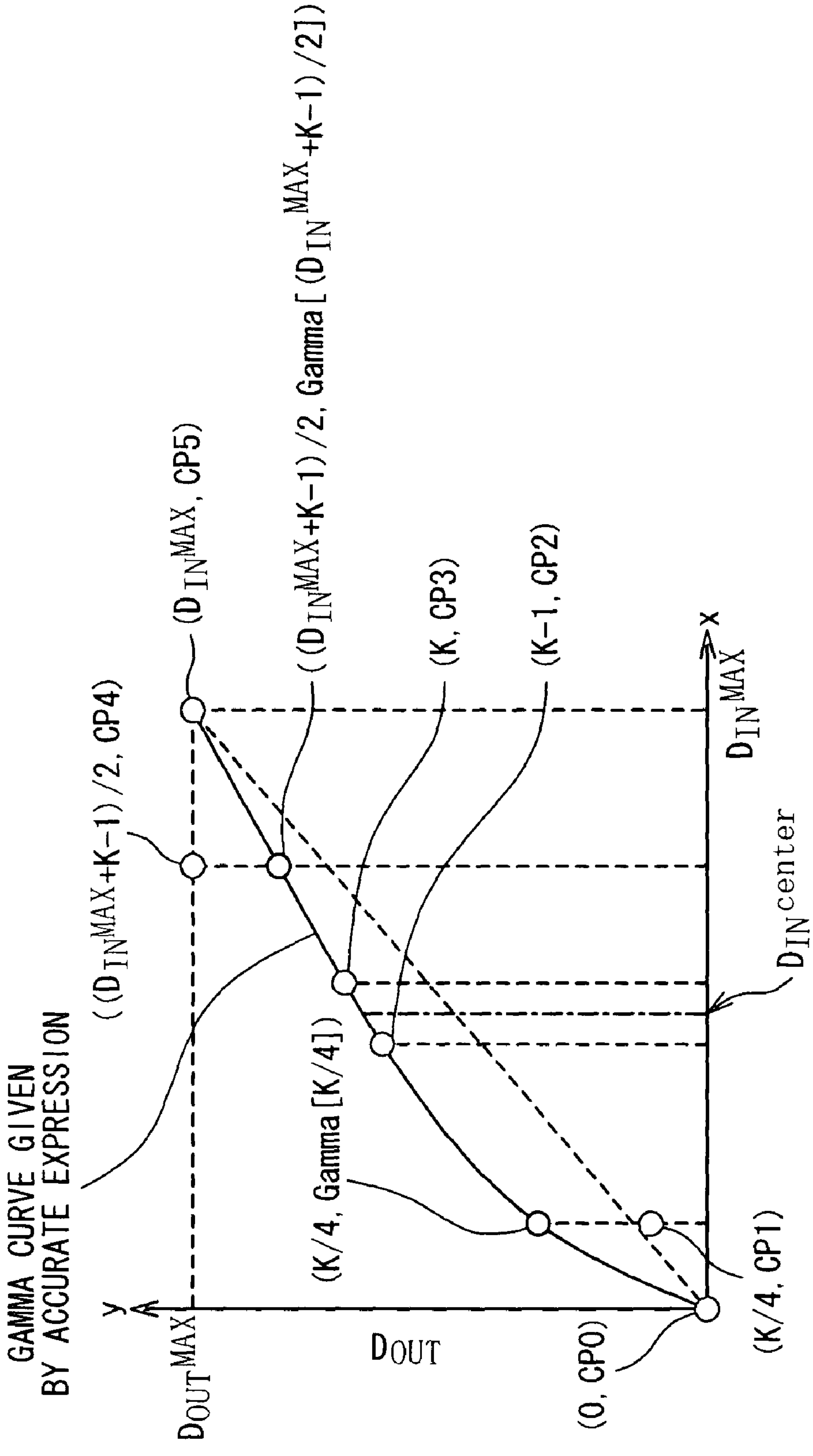
FIG. 4A is a graph representing a meaning of correction point data CP0 to CP5 of a correction point data set corresponding to a gamma value γ smaller than 1.

FIG. 4A is a graph representing the correction point data CP0 to CP5 of the correction point data set $CP^{(i)}$ corresponding to the gamma value γ smaller than 1. In a coordinate system where the x-axis is the input gray-scale data $D_{IN}$ and the y-axis is the output gray-scale data $D_{OUT}$, the correction point data CP0 to CP5 specifies the shape of the gamma curve by the approximate expression. The correction point data CP0, CP2, CP3 and CP5 represent y-coordinates of points on the gamma curve whose x-coordinates are 0, K−1, K and $D_{IN}^{MAX}$, respectively. That is to say, the points located on the coordinates (0, CP0), (K−1, CP2), (K, CP3) and ($D_{IN}^{MAX}$, CP5) are on the gamma curve defined by the accurate expression, as is obvious from the above-mentioned equations (1a) to (3). On the other hand, the correction point data CP1 and CP4 represent y-coordinates of points whose x-coordinates are K/4 and ($D_{IN}^{MAX}$+K−1)/2, respectively. Although the coordinates (K/4, CP1) and (($D_{IN}^{MAX}$+K−1)/2, CP4) are not located on the gamma curve, they are in positions related to the shape of the gamma curve.

Figure 4B:
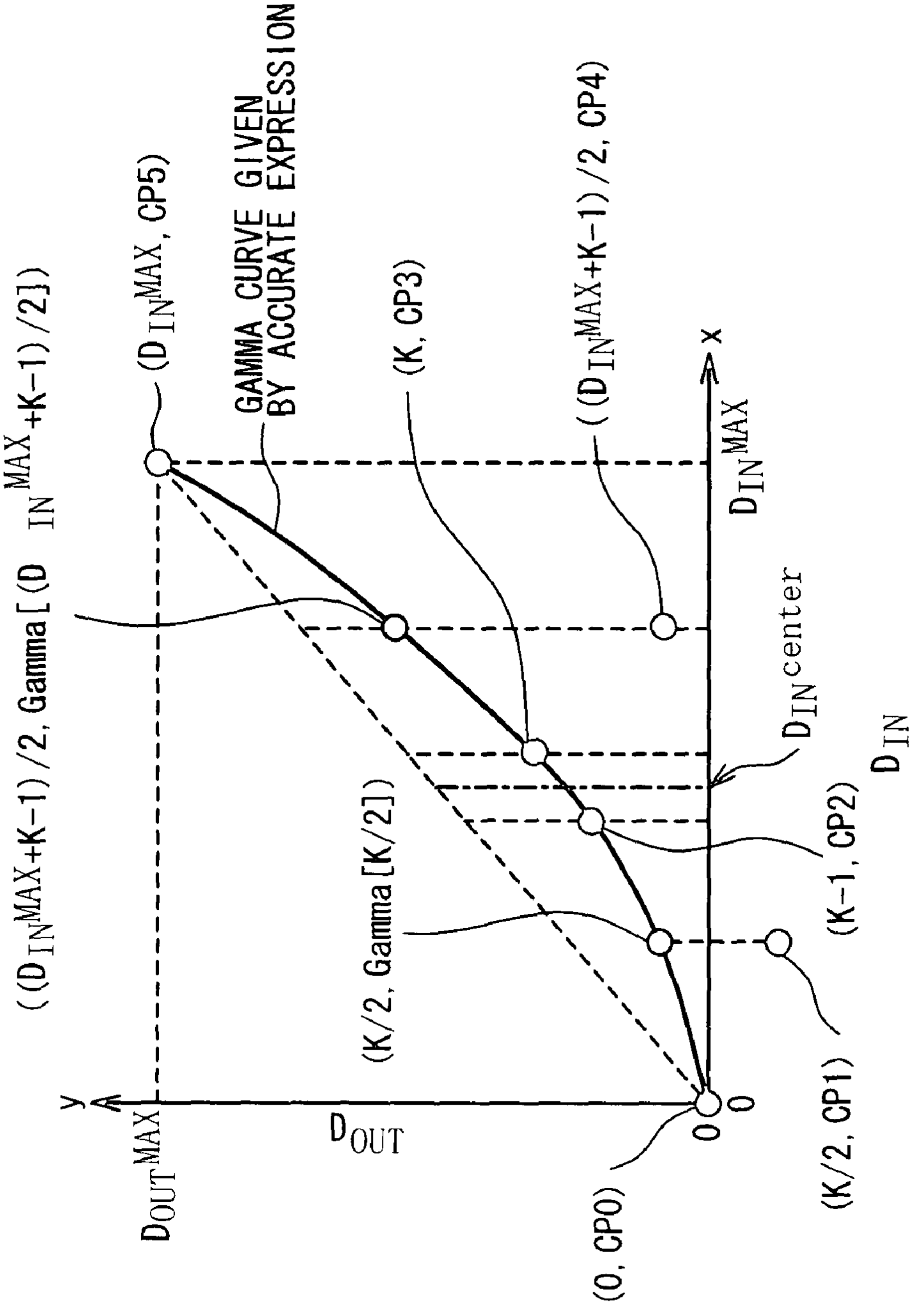
FIG. 4B is a graph representing a meaning of correction point data CP0 to CP5 of a correction point data set corresponding to a gamma value γ equal to or larger than 1.

On the other hand, FIG. 4B is a graph representing the correction point data CP0 to CP5 of the correction point data set $CP^{(i)}$ corresponding to the gamma value γ equal to or larger than 1. The points located on coordinates (0, CP0), (K−1, CP2), (K, CP3) and ($D_{IN}^{MAX}$, CP5) are on the gamma curve defined by the accurate expression, as is obvious from the above-mentioned equations (1a) to (3). On the other hand, the correction point data CP1 and CP4 represent y-coordinates of points whose x-coordinates are K/2 and ($D_{IN}^{MAX}$+K−1)/2, respectively. Although the coordinates (K/2, CP1) and (($D_{IN}^{MAX}$+K−1)/2, CP4) are not located on the gamma curve, they are in positions related to the shape of the gamma curve.

It should be noted that the different definitions are given to the correction point data CP1 according to whether or not the gamma value γ is smaller than 1. In the case where the gamma value γ is smaller than 1, the gamma curve rises rapidly near the origin. Therefore, in that case, the correction point data CP1 specifying the shape of the gamma curve is defined by a relatively small x-coordinate.

(Configuration and Function of Correction Point Data Calculation Circuit)

The correction point data calculation circuit 13 stores the correction point data sets $CP^{(1)}$~$CP^{(m)}$ composed of the correction point data CP0 to CP5 calculated by the above-mentioned equation (1a) or (1b), and selects the selected correction point data sets $CP\_sel^{R}$, $CP\_sel^{G}$ and $CP\_sel^{B}$ from the stored correction point data sets $CP^{(1)}$~$CP^{(m)}$.

Figure 2:
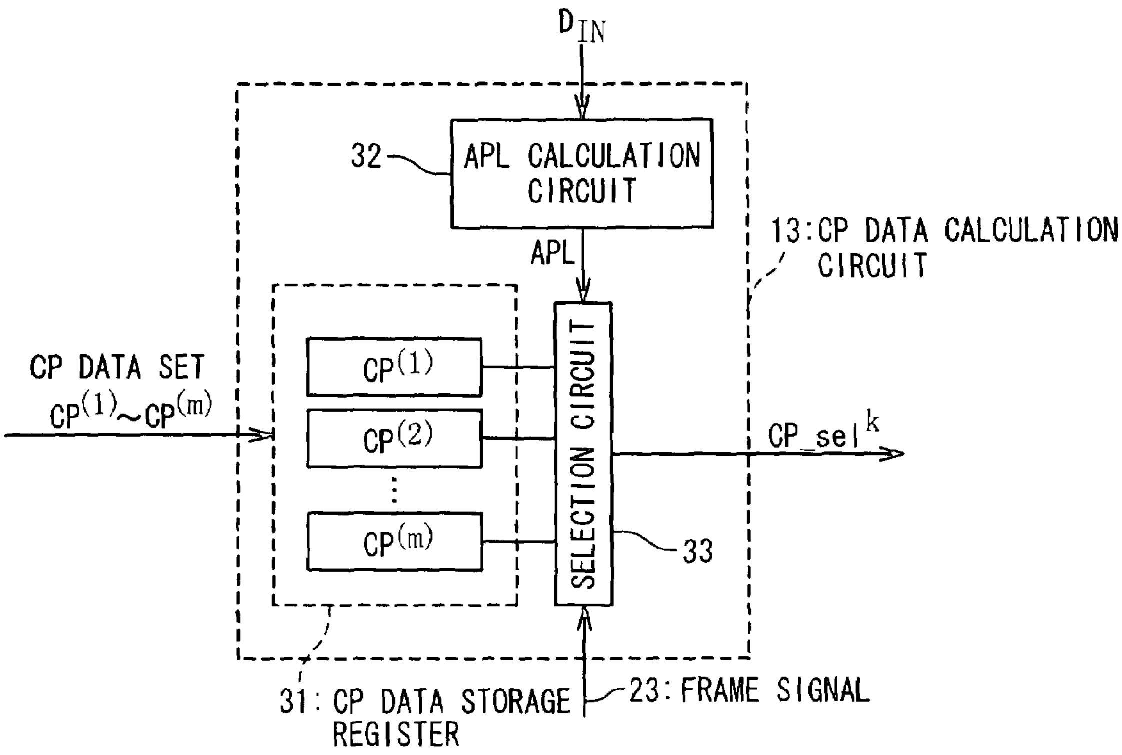
FIG. 2 is a block diagram showing a configuration of a correction point data calculation circuit in the first embodiment.

FIG. 2 is a block diagram showing a configuration of the correction point data calculation circuit 13. The correction point (CP) data calculation circuit 13 is provided with a correction point (CP) data storage register 31, an APL calculation circuit 32 and a selection circuit 33. The correction point data storage register 31 is configured to store the correction point data set $CP^{(1)\sim(m)}$ received from the image display circuit 3.

The APL calculation circuit 32 calculates the APL of each frame image from the input gray-scale data $D_{IN}$. The APL of a certain frame image is an average value of the input gray-scale data $D_{IN}$ corresponding to the certain frame image.

In the present embodiment, the APL calculated by the APL calculation circuit 32 calculates is an M-bits data. The number of the correction point data sets $CP^{(1)\sim(m)}$ stored in the correction point data storage register 31 is $2^M$. That is to say, m is equal to $2^M$.

Based on the calculated APL, the selection circuit 33 selects the selected correction point data sets $CP\_sel^{R}$, $CP\_sel^{G}$ and $CP\_sel^{B}$ from the correction point data sets $CP^{(1)\sim(m)}$ stored in the correction point data storage register 31. The selection circuit 33 selects the selected correction point data sets $CP\_sel^R$, $CP\_sel^G$ and $CP\_sel^B$ such that the gamma value γ used in the gamma correction becomes smaller as the calculated APL is smaller. In other words, the selection circuit 33 selects the correction point data set $CP^{(i)}$ corresponding to the smaller gamma value γ as the selected correction point data set $CP\_sel^k$, as the calculated APL is smaller. As a result, when the frame image is dark on the whole and its contrast is not clear, the contrast is enhanced and hence excellent picture quality can be obtained. The selected correction point data sets $CP\_sel^R$, $CP\_sel^G$ and $CP\_sel^B$ are transmitted to the approximate operation and correction circuit 14. The transmission of the selected correction point data set $CP\_sel^k$ to the approximate operation and correction circuit 14 is carried out in synchronization with the frame signal 23.

(Configuration and Function of Approximate Operation and Correction Circuit)

The approximate operation and correction circuit 14 performs the gamma correction of the input gray-scale data $D_{IN}$ based on the arithmetic expression by using the selected correction point data set $CP\_sel^k$ transmitted from the correction point data calculation circuit 13. As a result, the gamma correction is performed with the use of a proper gamma value suitable for the APL of each frame image.

It should be noted that the approximate operation and correction circuit 14 does not use the LUT for the gamma correction. As described above, when the LUT is used in the gamma correction, it is necessary to provide a memory having a sufficient capacity for storing the LUT, which increases the circuit size. In addition, a large amount of data transfer is necessary for switching the gamma value, which causes undesirable increase in the electric power consumption. According to the present invention, the circuit size is suppressed because the LUT is eliminated from the approximate operation and correction circuit 14. In addition, the switching of the gamma value used in the gamma correction is achieved by switching the selected correction point data set $CP\_sel^k$, and thus the switching of the gamma value can be achieved with a small amount of data transfer.

Figure 3:
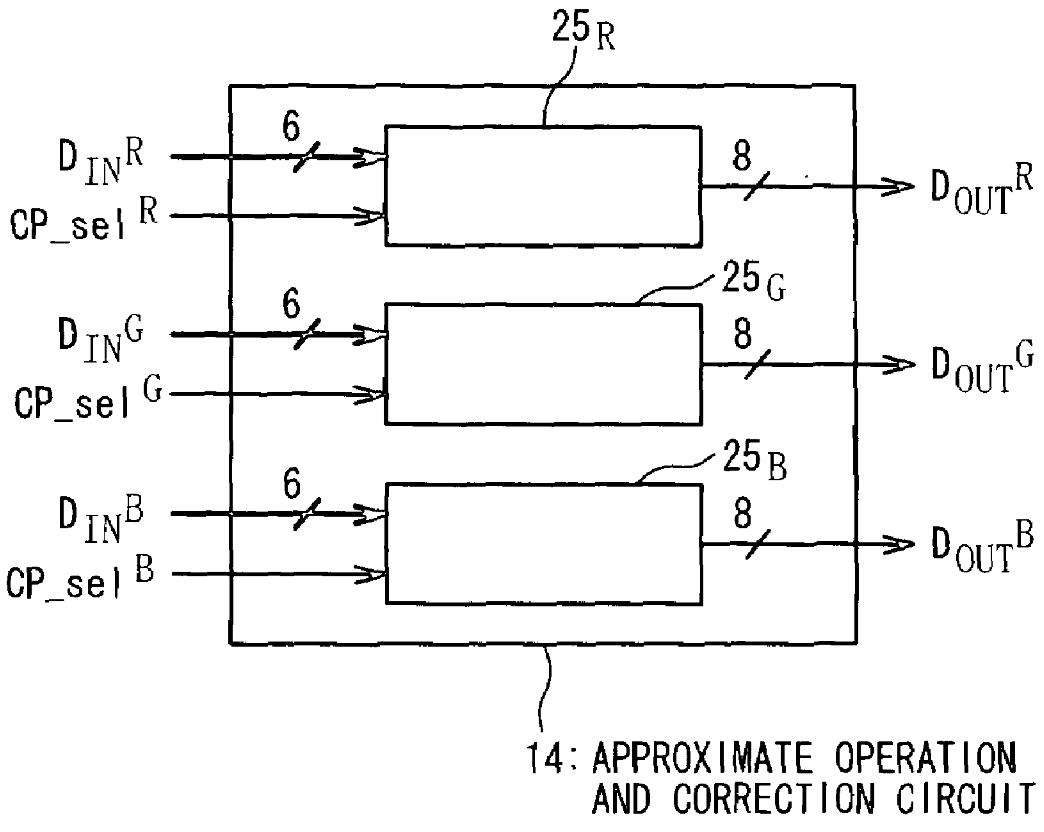
FIG. 3 is a block diagram showing a configuration of an approximate operation and correction circuit in the first embodiment.

FIG. 3 is a block diagram showing a configuration of the approximate operation and correction circuit 14. The approximate operation and correction circuit 14 is provided with approximate operation units $\mathbf{25}_R$, $\mathbf{25}_G$ and $\mathbf{25}_B$ that are prepared for the R-pixel, G-pixel and B-pixel, respectively.

The approximate operation units $\mathbf{25}_R$, $\mathbf{25}_G$ and $\mathbf{25}_B$ perform the gamma correction based on the arithmetic expression with respect to the input gray-scale data $D_{IN}^R$ $D_{IN}^G$ and $D_{IN}^B$ to generate the output gray-scale data $D_{OUT}^R$, $D_{OUT}^G$ and $D_{OUT}^B$. As mentioned above, the number of bits of each of the output gray-scale data $D_{OUT}^R$, $D_{OUT}^G$ and $D_{OUT}^B$ is eight, which is larger than the number of bits of each of the input gray-scale data $D_{IN}^R$, $D_{IN}^G$ and $D_{IN}^B$.

The coefficients of the arithmetic expression which the approximate operation unit $\mathbf{25}_R$ uses in the gamma correction is determined depending on the correction point data CP0 to CP5 of the selected correction point data set $CP\_sel^R$. Similarly, the coefficients of the arithmetic expression which the approximate operation units $\mathbf{24}_G$ and $\mathbf{24}_B$ use in the gamma correction are determined depending on the correction point data CP0 to CP5 of the selected correction point data sets $CP\_sel^G$ and $CP\_sel^B$, respectively.

The functions of the approximate operation units $\mathbf{25}_R$, $\mathbf{25}_G$ and $\mathbf{25}_B$ are the same except that the input gray-scale data and the correction point data are different from each other. The approximate operation units $\mathbf{25}_R$, $\mathbf{25}_G$ and $\mathbf{25}_B$ may be hereinafter referred to as an approximate operation unit 25 by omitting the suffix, when they are not distinguished from each other.

The approximate operation unit 25 calculates the output gray-scale data $D_{OUT}$ according to the following equation (4a), (4b) or (4c).

(1) In a case where $D_{IN}$ is smaller than $D_{IN}^{Center}$ and CP1 is larger than CP0:

$$D_{OUT} = \frac{2(CP1 - CP0)\cdot PD_{INS}}{K^2} + \frac{(CP3 - CP0)D_{INS}}{K} + CP0. \tag{4a}$$

It should be noted that the correction point data CP1 being larger than the correction point data CP0 means that the gamma value γ used in the gamma correction is smaller than 1 (refer to FIG. 4A).

(2) In a case where $D_{IN}$ is smaller than $D_{IN}^{Center}$ and CP1 is equal to or smaller than CP0:

$$D_{OUT} = \frac{2(CP1 - CP0)\cdot ND_{INS}}{K^2} + \frac{(CP3 - CP0)D_{INS}}{K} + CP0. \tag{4b}$$

It should be noted that the correction point data CP1 being equal to or smaller than the correction point data CP0 means that the gamma value γ used in the gamma correction is equal to or larger than 1 (refer to FIG. 4B).

(3) In a case where $D_{IN}$ is larger than $D_{IN}^{Center}$:

$$D_{OUT} = \frac{2(CP4 - CP2)\cdot ND_{INS}}{K^2} + \frac{(CP5 - CP2)D_{INS}}{K} + CP2. \tag{4c}$$

The intermediate data value $D_{IN}^{Center}$ is a value defined by the following equation (5) with the use of the maximum value $D_{IN}^{MAX}$ of the input gray-scale data $D_{IN}$:

$$D_{IN}^{Center} = D_{IN}^{MAX}/2 \tag{5}$$

The parameter K is given by the above-mentioned equation (2). The $D_{INS}$, $PD_{INS}$ and $ND_{INS}$ that appear in the equations (4a) to (4c) are values defined as follows.

(a) $D_{INS}$

The $D_{INS}$ is a value depending on the input gray-scale data $D_{IN}$ and is given by the following equations (6a) and (6b):

$$D_{INS} = D_{IN} \text{ (for } D_{IN} < D_{IN}^{Center}), \tag{6a}$$

$$D_{INS} = D_{IN} + 1 - K \text{ (for } D_{IN} > D_{IN}^{Center}). \tag{6b}$$

(b) $PD_{INS}$

The $PD_{INS}$ is defined by the following equation (7a) by using a parameter R defined by the following equation (7b):

$$PD_{INS} = (K - R)\cdot R, \tag{7a}$$

$$R = K^{1/2}\cdot D_{INS}^{1/2}, \tag{7b}$$

As can be understood from the equations (6a), (6b), (7a) and (7*b*), the parameter R is a value proportional to the square root of $D_{IN}$, and therefore the $PD_{INS}$ is a value calculated by an equation including a term proportional to the square root of $D_{IN}$ and a term proportional to $D_{IN}$.

(c) $ND_{INS}$

The $ND_{INS}$ is given by the following equation (8):

$$ND_{INS} = (K - D_{INS})\cdot D_{INS}, \tag{8}$$

As can be understood from the equations (6a), (6b) and (8), the $ND_{INS}$ is a value calculated by an equation including a term proportional to the square of the input gray-scale data $D_{IN}$.

It should be noted the parameter K is a number expressed by the n-th power of two (n is a numeral larger than 1). The maximum value $D_{IN}^{MAX}$ of the input gray-scale data $D_{IN}$ is equal to a value obtained by subtracting 1 from a number expressed by the n-th power of two. Therefore, the parameter K given by the above equation (2) is expressed by the n-th power of two. For example, in a case where the input gray-scale data $D_{IN}$ is of 6-bits, the maximum value $D_{IN}^{MAX}$ is 63 and the parameter K is 32. This is useful for performing the calculation of the equations (4a) to (4c) with a simple circuit. The reason is that the division by the number expressed by the n-th power of two can be achieved with ease by using a right shift circuit. Although the equations (4a) to (4c) include the division by the parameter K, the division can be achieved by a simple circuit since the parameter K is a number expressed by the n-th power of two.

One characteristic of the above-mentioned equations (4a) to (4c) is that the equations (4a) to (4c) include a term representing a curve, a term representing a line and a constant term. The first term of the equations (4a) to (4c) represents a curve, as can be understood from the fact that the value $PD_{INS}$ depends on the square root of the input gray-scale data $D_{IN}$ and the value $ND_{INS}$ depends on the square of the input gray-scale data $D_{IN}$. The second term, which is proportional to the $D_{INS}$, represents a line. Any of the CP0 and CP2, which is independent of the input gray-scale data $D_{IN}$, is a constant term. By using such the equations in the gamma correction, it is possible to perform the gamma correction approximately with reducing an error.

(Operation of Liquid Crystal Display Device)

Next, an operation of the LCD device 1 according to the present embodiment will be explained below.

The correction point data sets $CP^{(1)}$~$CP^{(m)}$ are transferred from the image display circuit 3 to the correction point data calculation circuit 13 of the controller driver 4 in advance. The correction point data sets $CP^{(1)}$~$CP^{(m)}$ are stored in the correction point data storage register 31 of the correction point data calculation circuit 13.

The input gray-scale data $D_{IN}$ of a frame image to be displayed on the LCD panel 2 in the F-th frame period is transferred to the controller driver 4 in the precedent frame period, i.e. the (F−1)-th frame period. The memory controller 11 of the controller driver 4 receives the input gray-scale data $D_{IN}$ and writes the received input gray-scale data $D_{IN}$ in the display memory 12.

The input gray-scale data $D_{IN}$ transferred to the controller driver 4 is further transmitted to the correction point data calculation circuit 13. Based on the received input gray-scale data $D_{IN}$, the APL calculation circuit 32 of the correction point data calculation circuit 13 calculates the APL of the frame image to be displayed on the LCD panel 2 in the F-th frame period. Depending on the calculated APL, the selection circuit 33 of the correction point data calculation circuit 13 selects the selected correction point data sets $CP\_sel^R$, $CP\_sel^G$ and $CP\_sel^B$.

When the F-th frame period is started, the timing controller 19 activates the frame signal 23. In response to the activation of the frame signal 23, the selection circuit 33 supplies the selected correction point data sets $CP\_sel^R$, $CP\_sel^G$ and $CP\_sel^B$ to the approximate operation and correction circuit 14.

Moreover, the input gray-scale data $D_{IN}$ of the frame image to be displayed on the LCD panel 2 is transmitted from the display memory 12 to the approximate operation and correction circuit 14. The approximate operation and correction circuit 14 calculates the output gray-scale data $D_{OUT}$ by using the above-mentioned equations (4a) to (4c), and transmits the calculated output gray-scale data $D_{OUT}$ to the color decrease circuit 15. The color decrease circuit 15 performs a color decrease operation with respect to the output gray-scale data $D_{OUT}$ generated by the approximate operation and correction circuit 13 to generate the post-color-decrease output gray-scale data $D_{OUT\text{-}D}$. The latch circuit 16 latches the post-color-decrease output gray-scale data $D_{OUT\text{-}D}$ from the color decrease circuit 15, and transfers the latched post-color-decrease output gray-scale data $D_{OUT\text{-}D}$ to the data line driver 17. In accordance with the post-color-decrease output gray-scale data $D_{OUT\text{-}D}$ transmitted from the latch circuit 16, the data line driver 17 drives the corresponding data lines of the LCD panel 2. In this manner, the frame image of the F-th frame period is displayed on the LCD panel 2.

According to the above-described operation, the selected correction point data set $CP\_sel^k$ is selected on the basis of the APL of the frame image and thus the gamma correction can be performed with the use of the gamma value γ suitable for every frame image.

As described above, the liquid crystal display device 1 of the present embodiment performs the gamma correction based on the approximate expression while switching the gamma value γ depending on the APL of every frame image. Since the LUT is not used for performing the gamma correction, the circuit size is reduced. In addition, the switching of the gamma value γ is achieved by switching the coefficients of the approximate expression depending on the selected correction point data set $CP\_sel^k$. Therefore, the liquid crystal display device 1 of the present embodiment is capable of switching the gamma value with a small amount of data transfer, which is effective for reducing the electric power consumption.

Figure 15A:
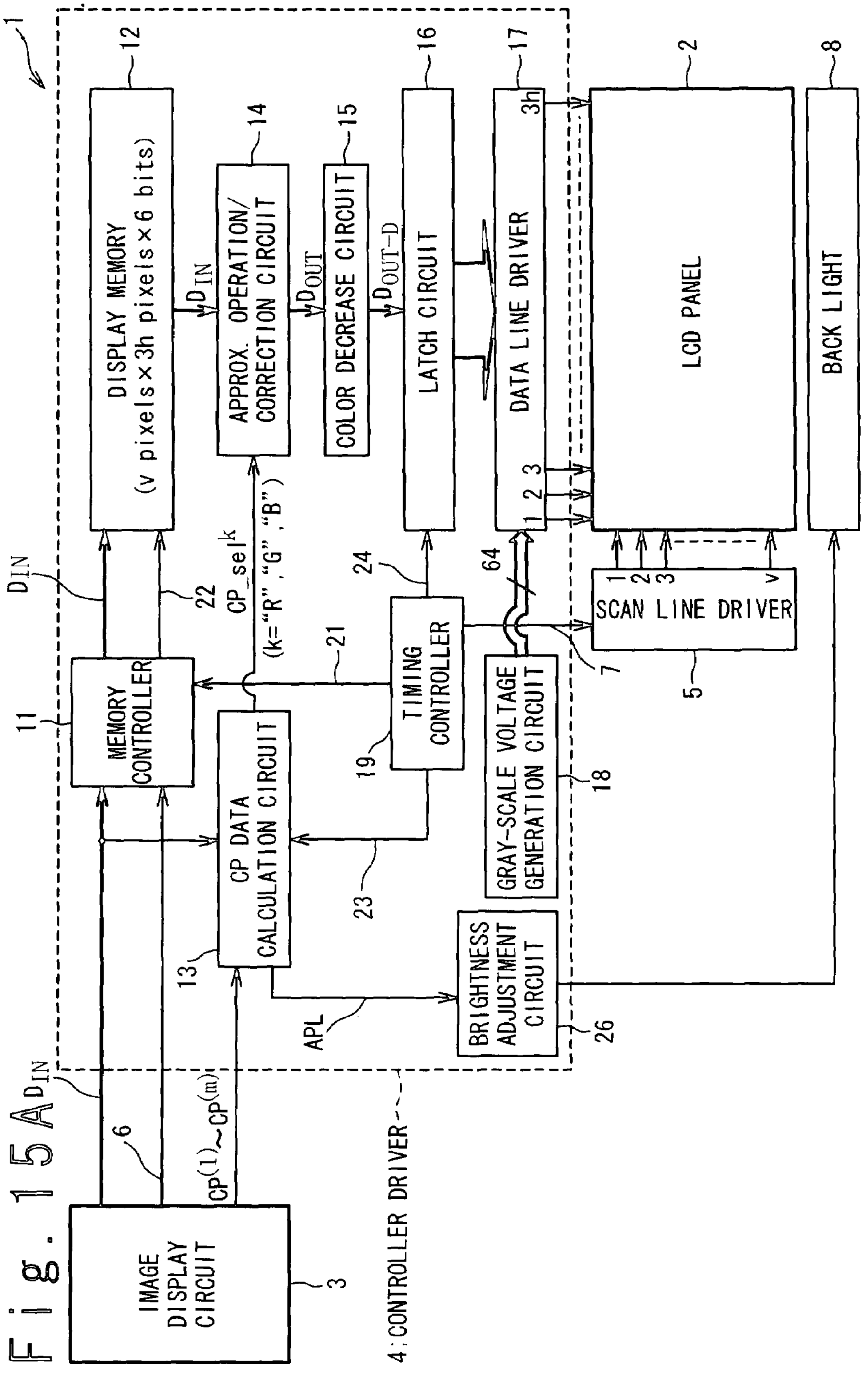
FIG. 15A is a block diagram showing an modified example of the liquid crystal display device according to the first and the second embodiments.

Moreover, in a case where the controller driver 4 of the present embodiment is provided with a back light brightness adjustment circuit 26 for adjusting brightness of the back light 8 as shown in FIG. 15A, the back light brightness adjustment circuit 26 preferably control the brightness of the back light 8 depending on the APL calculated by the correction point data calculation circuit 13. In this case, the brightness of the back light 8 is controlled to be lower as the APL is smaller. According to such a control, it is possible to achieve the reduction of the electric power consumption without deterioration of the picture quality. With regard to a frame image with a small APL, namely, a dark frame image, the brightness of the back light 8 is controlled to be lower by the back light brightness adjustment circuit 26 and the gamma value is controlled to be smaller by the correction point data calculation circuit 13 and the approximate operation and correction circuit 14. Since the brightness of the back light 8 is set smaller and the display image is made brighter when the dark frame image is displayed, it is possible to reduce the electric power consumption without deterioration of the picture quality.

In the present embodiment shown in FIG. 1, the color decrease circuit 15 is used. It should be noted that a configuration that does not use the color decrease circuit 15 is possible. In that case, the color decrease circuit 15 is eliminated and hence the output gray-scale data $D_{OUT}$ of 8-bits is directly input to the latch circuit 16. Then, in accordance with the output gray-scale data $D_{OUT}$, the data line driver 17 selects a corresponding gray-scale voltage from the plurality of gray-scale voltages supplied from the gray-scale voltage generation circuit 18. Then, the data line driver 17 drives the corresponding data lines of the LCD panel 2 to the selected gray-scale voltage. The number of gray-scale voltages supplied from the gray-scale voltage generation circuit 18 is 256.

2. Second Embodiment

The fineness of adjustment of the gamma value used in the gamma correction depends on the number m of the correction point data sets $CP^{(1)}$~$CP^{(m)}$ stored in the correction point data calculation circuit 13. In a case where m is 16, for example, the gamma value used in the gamma correction is adjustable in 16 levels. In this case, the APL is calculated to be 4-bits data such that the gamma value switching in 16 levels is possible.

Figure 5:
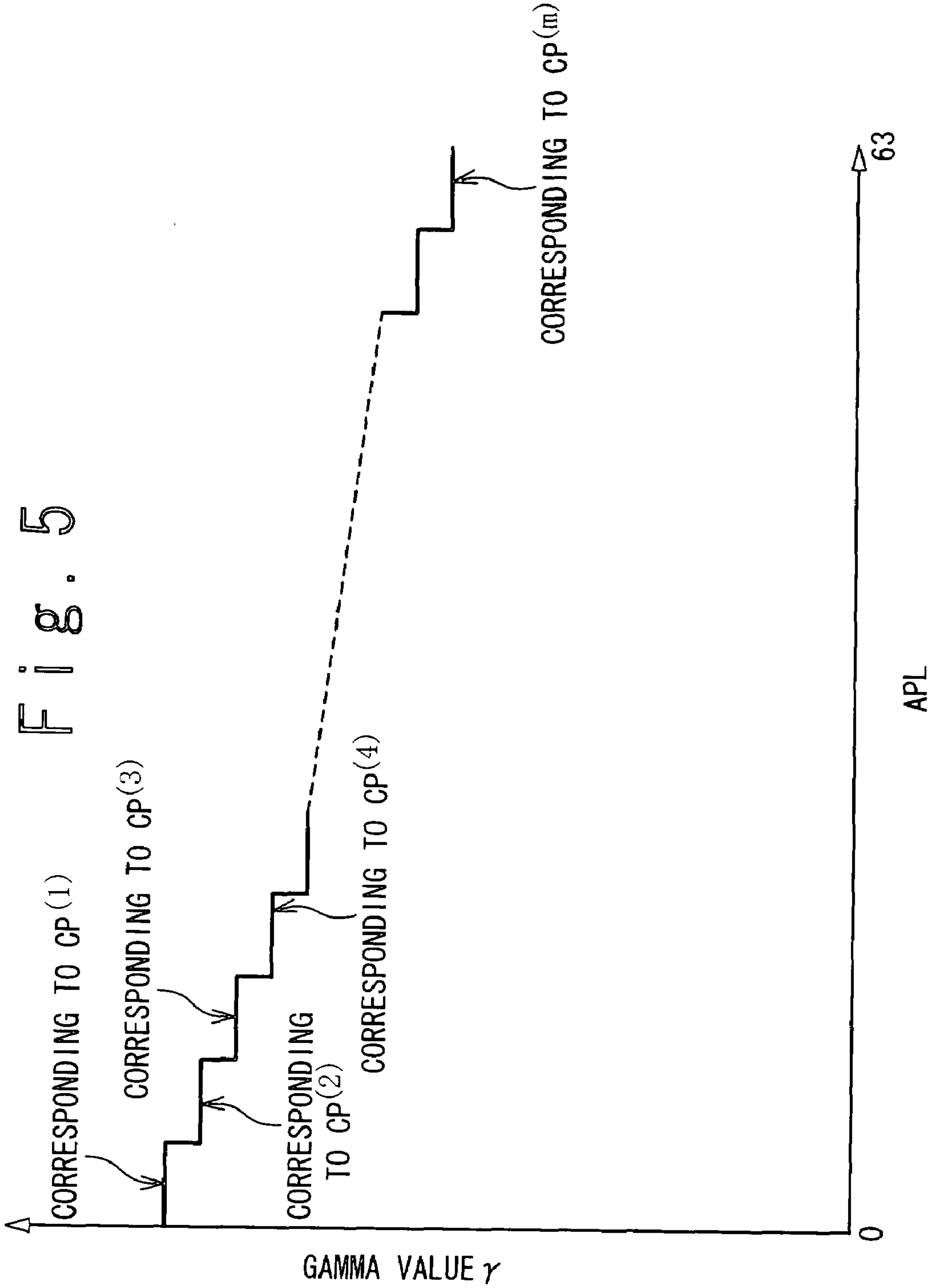
FIG. 5 is a graph representing a relationship between an APL and a gamma value designated by the APL in the liquid crystal display device of the first embodiment.

As shown in FIG. 5, when the number m of the correction point data sets $CP^{(1)}$~$CP^{(m)}$ stored in the correction point data calculation circuit 13 is small, the gamma value used in the gamma correction is allowed to be adjusted only roughly. For example, when the APL is increased and hence the selected correction point data set $CP\_sel^k$ is switched from the correction point data set $CP^{(i)}$ to the correction point data set $CP^{(i+1)}$, the gamma value γ used in the gamma correction changes greatly. If the gamma value γ changes greatly, the display image changes suddenly, which may bring discomfort to an observer of the LCD panel 2.

In order to adjust the gamma value used in the gamma correction finely, it can be considered to increase the number m of the correction point data sets $CP^{(1)}$~$CP^{(m)}$ stored in the correction point data calculation circuit 13. However, this increases the circuit size of the correction point data storage register 31, which is unfavorable.

Figure 6:
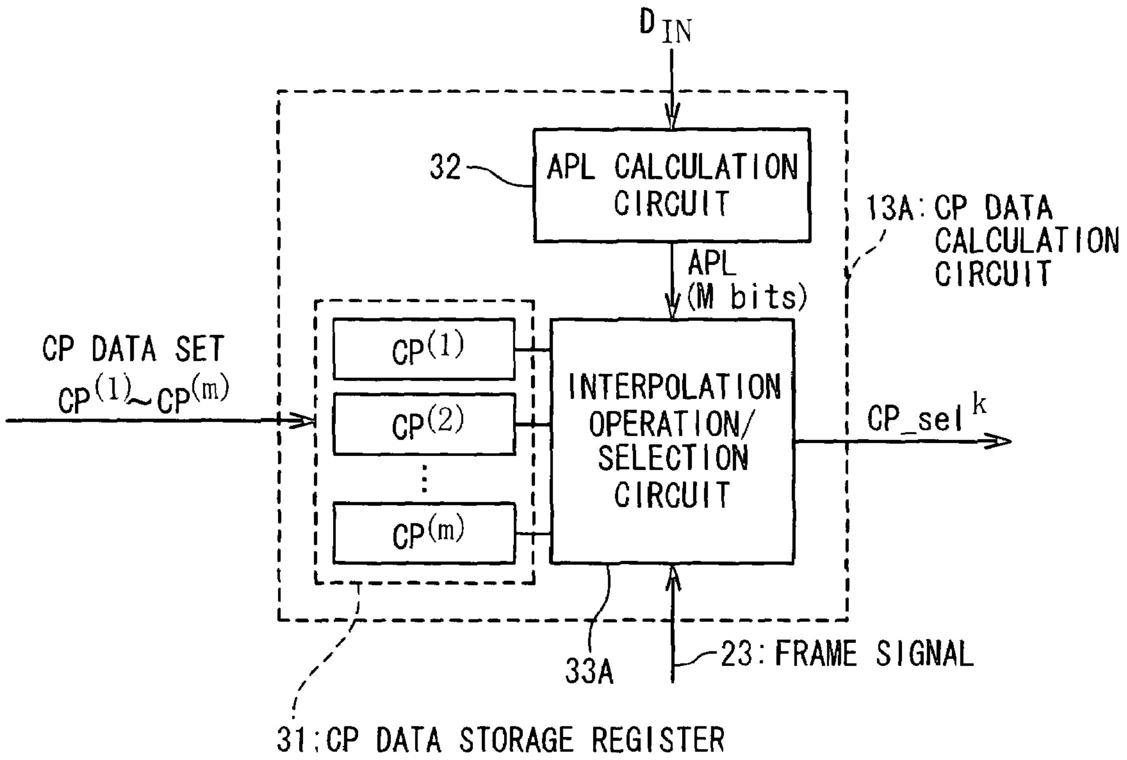
FIG. 6 is a block diagram showing a configuration of a correction point data calculation circuit in a second embodiment.

In the second embodiment, for the purpose of adjusting the gamma value finely with a small circuit size, the correction point data CP0 to CP5 of the selected correction point data set $CP\_sel^k$ is obtained by an interpolation calculation of the correction point data CP0 to CP5 of the correction point data sets $CP^{(1)}$~$CP^{(m)}$. In order to carry out the interpolation calculation, a correction point data calculation circuit 13A shown in FIG. 6 is used instead of the correction point data calculation circuit 13 shown in FIG. 2. In the correction point data calculation circuit 13A, an interpolation operation and selection circuit 33A is used instead of the selection circuit 33. The interpolation operation and selection circuit 33A calculates the correction point data CP0 to CP5 of the selected correction point data set $CP\_sel^k$ by the interpolation calculation of the correction point data CP0 to CP5 of the correction point data sets $CP^{(1)}$~$CP^{(m)}$. Moreover, the interpolation operation and selection circuit 33A supplies the selected correction point data set $CP\_sel^k$ to the approximate operation and correction circuit 14.

The correction point data calculation circuit 13A operates as follows. The APL calculation circuit 32 calculates the APL as M-bits data. Stored in the correction point data storage register 31 are $2^{M-N}$ correction point data sets $CP^{(1)}$~$CP^{(m)}$. That is, m is equal to $2^{M-N}$.

Depending on the upper (M-N) bits of the APL calculated by the APL calculation circuit 32, the interpolation operation and selection circuit 33A selects two of the correction point data sets $CP^{(1)}$~$CP^{(m)}$ stored in the correction point data storage register 31 with regard to each of the selected correction point data sets $CP\_sel^R$, $CP\_sel^G$ and $CP\_sel^B$; the two correction point data sets selected with respect to the selected correction point data set $CP\_sel^k$ (k is any of "R", "G" and "B") are referred to as correction point data sets $CP^{(i),k}$ and $CP^{(i+1),k}$ hereinafter.

Moreover, the interpolation operation and selection circuit 33A calculates the correction point data CP0 to CP5 of the respective selected correction point data sets $CP\_sel^R$, $CP\_sel^G$ and $CP\_sel^B$ by the interpolation calculation of the CP0 to CP5 of the selected two correction point data sets $CP^{(i),k}$ and $CP^{(i+1),k}$. More specifically, the correction point data CP0 to CP5 of the selected correction point data set $CP\_sel^k$ (k is any of "R", "G" and "B") is calculated by the following equation (9).

$$CP\alpha\_sel^k = CP\alpha^{(i),k} + \{(CP\alpha^{(i+1),k} - CP{=}^{(i),k})/2^N\} \times APL[N-1:0], \tag{9}$$

α: a numeral not less than 0 and not more than 5, $CP\alpha\_sel^k$: the correction point data CPα of the selected correction point data set $CP\_sel^k$, $CP\alpha^{(i),k}$: the correction point data CPα of the correction point data set $CP^{(i)}$ selected with regard to the selected correction point data set $CP\_sel^k$, and APL[N−1:0]: the lower N bits of the APL.

The selected correction point data sets $CP\_sel^R$, $CP\_sel^G$ and $CP\_sel^B$ thus calculated are transferred to the approximate operation and correction circuit 14 and are used in the gamma correction.

Figure 7:
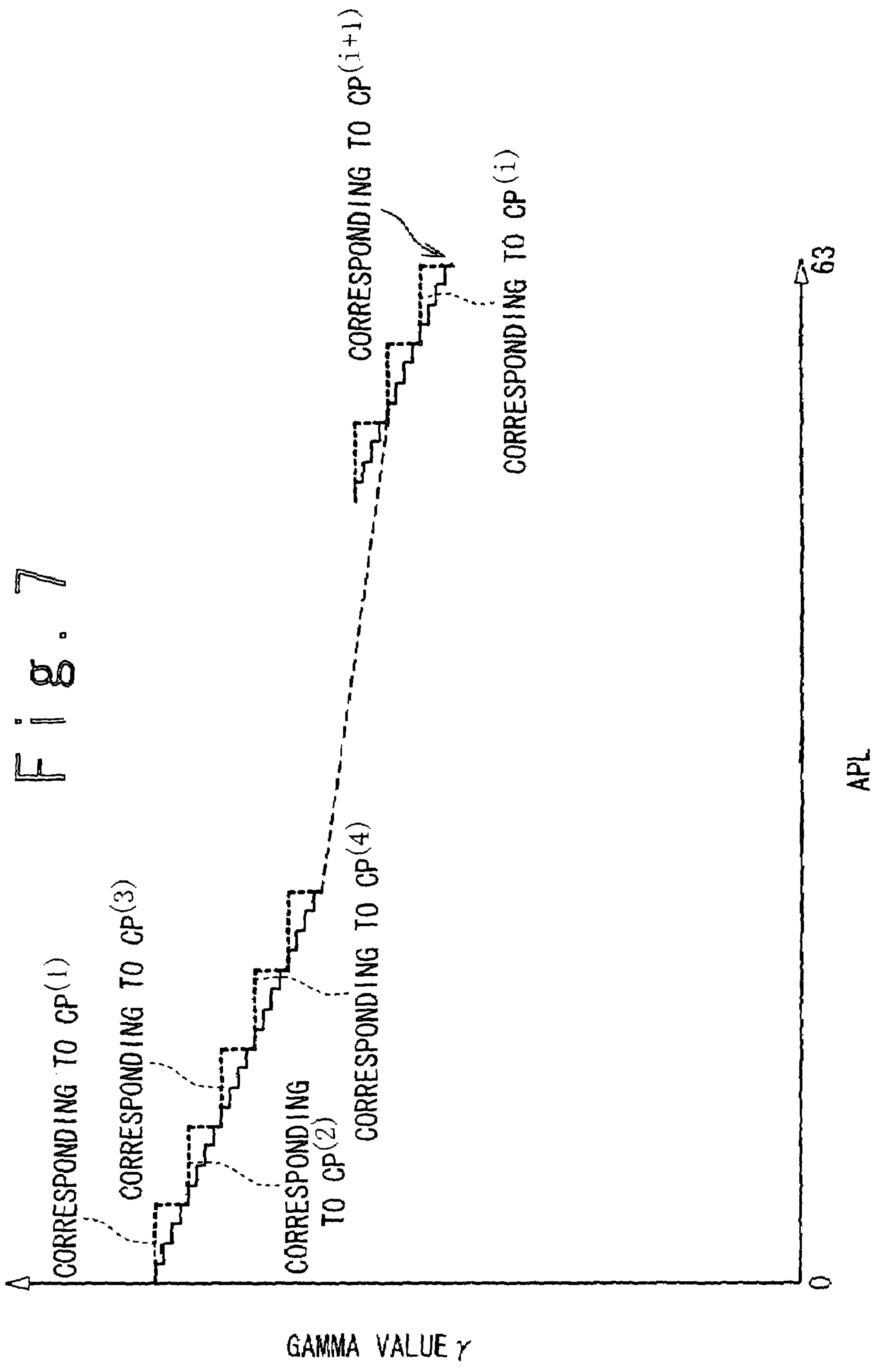
FIG. 7 is a graph representing a relationship between an APL and a gamma value designated by the APL in the liquid crystal display device of the second embodiment.
Figure 8:
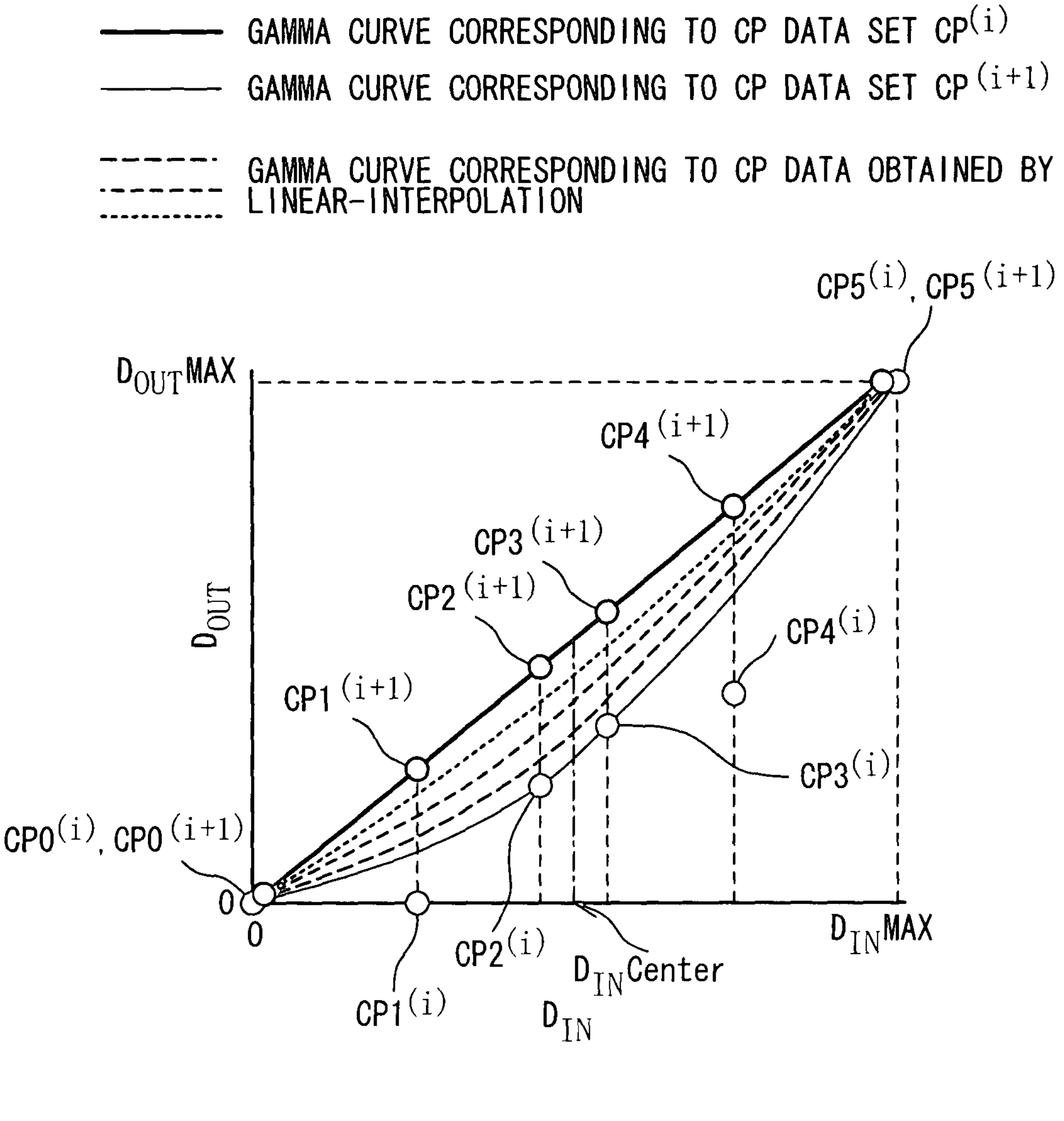
FIG. 8 is a graph showing a gamma curve obtained by a linear interpolation of the correction point data in the liquid crystal display device of the second embodiment.

FIG. 7 is a graph showing a relationship between the APL and the gamma value used in the gamma correction in the case where the correction point data calculation circuit 13A shown in FIG. 6 is used. By calculating the correction point data CP0 to CP5 of the selected correction point data set $CP\_sel^k$ by the interpolation calculation, it is possible to perform the gamma correction with the use of a gamma value between gamma values corresponding to the correction point data sets $CP^{(1)}$~$CP^{(m)}$. For example, as shown in FIG. 8, it is possible to perform the gamma correction represented by a gamma curve that is located between a gamma curve of a gamma value corresponding to the correction point data set $CP^{(i)}$ and a gamma curve of a gamma value corresponding to the correction point data set $CP^{(i+1)}$. As described above, by calculating the correction point data CP0 to CP5 of the selected correction point data set $CP\_sel^k$ by the interpolation calculation, it is possible to adjust the gamma value finely with a small circuit size while suppressing the number m of the correction point data sets $CP^{(1)}$~$CP^{(m)}$ stored in the correction point data calculation circuit 13A.

As in the first embodiment, the controller driver 4 of the second embodiment can be provided with a back light brightness adjustment circuit for adjusting the brightness of the back light 8. In this case, the back light brightness adjustment circuit preferably controls the brightness of the back light 8, depending on the APL calculated by the correction point data calculation circuit 13.

3. Third Embodiment

Figure 9:
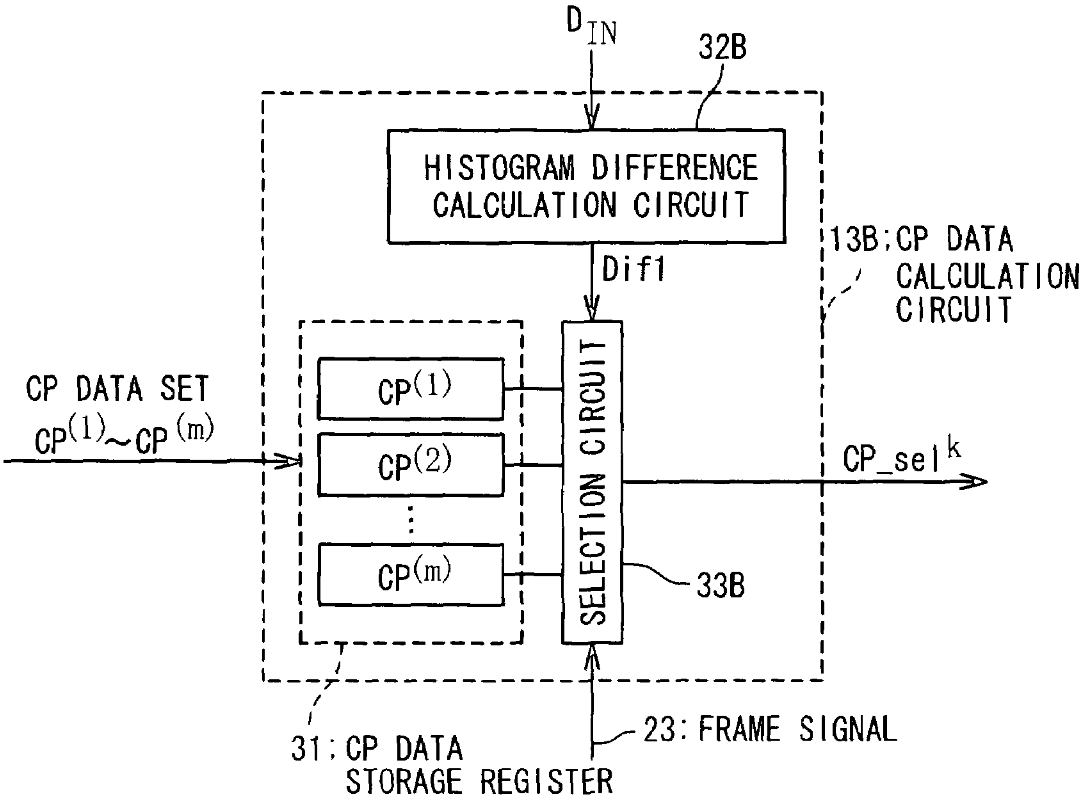
FIG. 9 is a block diagram showing a configuration of a correction point data calculation circuit in a third embodiment.

In the third embodiment, the selected correction point data sets $CP\_sel^R$, $CP\_sel^G$ and $CP\_sel^B$ are selected depending on a frequency distribution of the input gray-scale data of each frame image instead of the APL of the frame image, and thereby the switching of the gamma value γ used in the gamma correction is achieved. In other words, the frequency distribution of the input gray-scale data is used as an indicator of the brightness of each frame image, and the gamma value γ used in the gamma correction is switched depending on the brightness of each frame image. For the purpose of switching the gamma value γ depending on frequency distribution of the input gray-scale data, a correction point data calculation circuit 13B shown in FIG. 9 is used in the third embodiment instead of the correction point data calculation circuit 13 shown in FIG. 2.

The correction point data calculation circuit 13B is provided with the correction point data storage register 31, a histogram difference calculation circuit 32B and a selection circuit 33B. The correction point data storage register 31 stores the m correction point data sets $CP^{(1)}$~$CP^{(m)}$.

Figure 10:
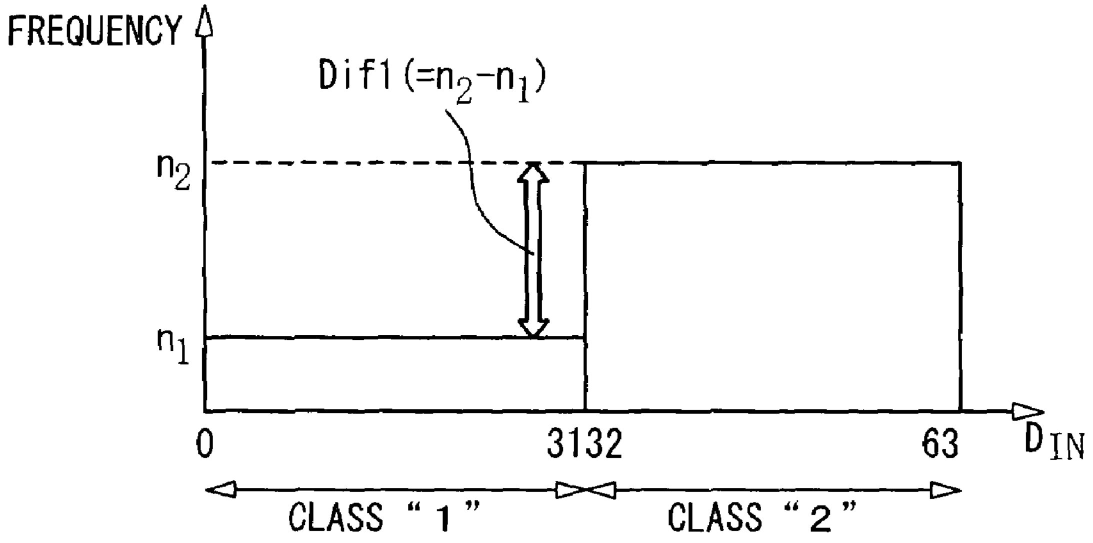
FIG. 10 is a graph for explaining a difference data Dif1 in the third embodiment.

The histogram difference calculation circuit 32B obtains the frequency distribution of the input gray-scale data of each frame image. As shown in FIG. 10, according to the present embodiment, the histogram difference calculation circuit 32B classifies a range of values of the input gray-scale data $D_{IN}$ into two classes: a class "1" and a class "2", and calculates frequencies (the numbers of times) of respective classes "1" and "2". Here, the class "1" corresponds to a range in which the input gray-scale data is smaller than the intermediate data value $D_{IN}^{Center}$, while the class "2" corresponds to a range in which the input gray-scale data is larger than the intermediate data value $D_{IN}^{Center}$. The intermediate data value $D_{IN}^{Center}$ is equal to half the maximum value $D_{IN}^{MAX}$ of the input gray-scale data $D_{IN}$, as defined by the above-mentioned equation (5). For example, in the case where the input gray-scale data is of 6-bits, the maximum value $D_{IN}^{MAX}$ of the input gray-scale data $D_{IN}$ is 63 and the intermediate data value $D_{IN}^{Center}$ is 31.5. Whether each input gray-scale data belongs to the class "1" or the class "2" can be determined easily by referring to the most significant bit (MSB) of the input gray-scale data. If the most significant bit of an input gray-scale data is "1", the histogram difference calculation circuit 32B determines that the input gray-scale data belongs to the class "2", otherwise determines that the input gray-scale data belongs to the class "1".

Furthermore, the histogram difference calculation circuit 32B calculates a difference data Dif1 from the obtained frequency distribution. The difference data Dif1 represents a difference in the frequency between the class "1" and the class "2", and is defined by the following equation (10):

$$\mathrm{Dif1}=n_2-n_1, \tag{10}$$

here, $n_1$ and $n_2$ are the frequencies of the classes "1" and "2", respectively. The difference data Dif1 represents the brightness of the frame image. In a case where the frame image is bright as a whole, the frequency of the class "2" becomes high and hence the difference data Dif1 is increased. Conversely, in a case where the frame image is dark as a whole, the frequency of the class "1" becomes high and hence the difference data Dif1 is decreased. The difference data Dif1 thus calculated is transmitted to the selection circuit 33B.

The selection circuit 33B selects the selected correction point data sets $CP\_sel^R$, $CP\_sel^G$ and $CP\_sel^B$ from the correction point data sets $CP^{(1)}$~$CP^{(m)}$, depending on the difference data Dif1. More specifically, the selection circuit 33B selects the selected correction point data set $CP\_sel^k$ corresponding to the smaller gamma value $\gamma$ as the calculated difference data Dif1 is smaller. As a result, when the frame image is dark on the whole and its contrast is not clear, the contrast is enhanced and hence excellent picture quality can be obtained. The selected correction point data sets $CP\_sel^R$, $CP\_sel^G$ and $CP\_sel^B$ are transmitted to the approximate operation and correction circuit 14 and used in the correction operation. The transmission of the selected correction point data set $CP\_sel^k$ to the approximate operation and correction circuit 14 is carried out in synchronization with the frame signal 23.

Figure 15B:
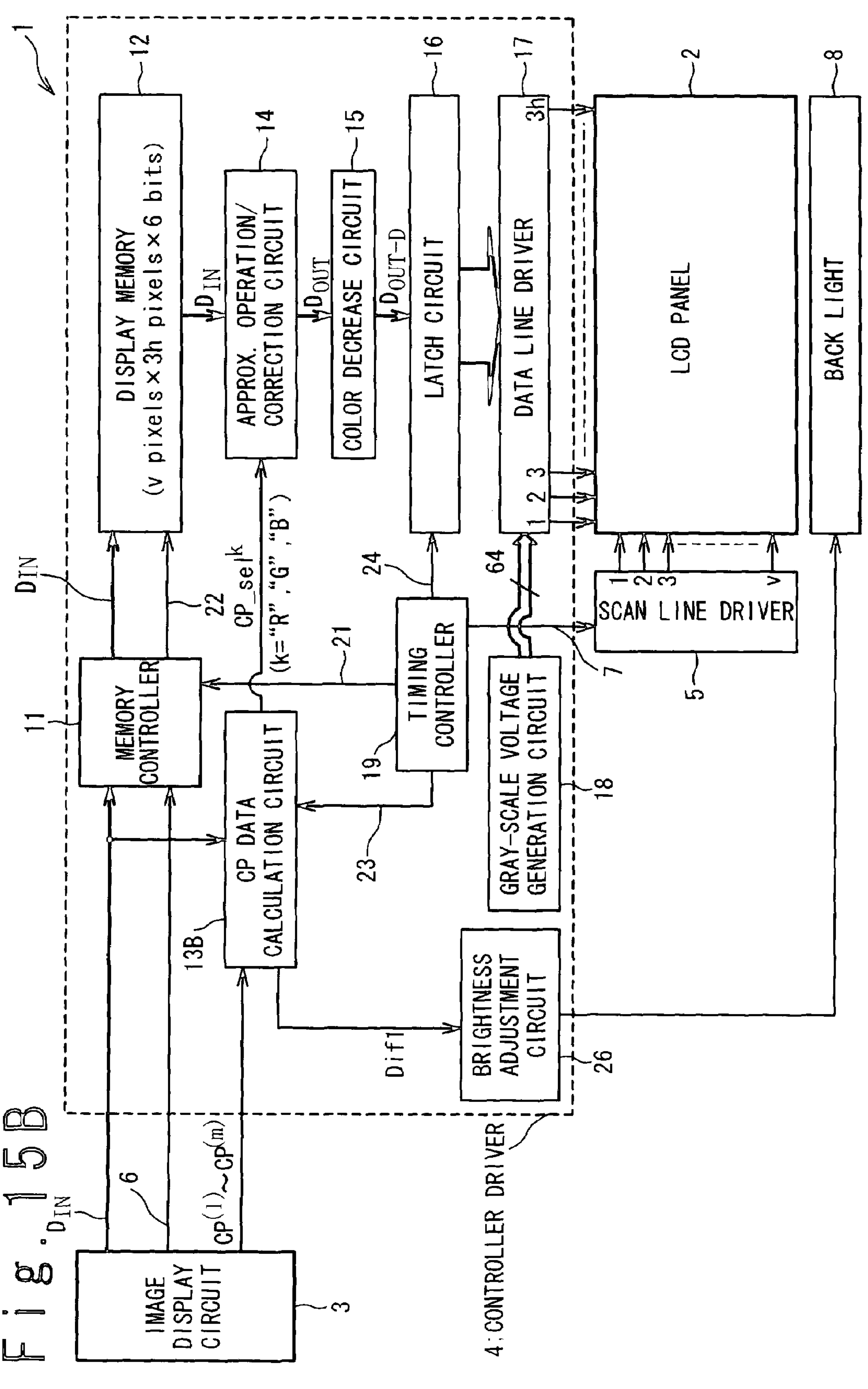
FIG. 15B is a block diagram showing an modified example of the liquid crystal display device according to the third and the fourth embodiments.

In a case where the controller driver 4 of the present embodiment is provided with a back light brightness adjustment circuit 26 for adjusting brightness of the back light 8 as shown in FIG. 15B, the back light brightness adjustment circuit 26 preferably control the brightness of the back light 8 depending on the difference data Dif1 calculated by the correction point data calculation circuit 13B. In this case, the brightness of the back light 8 is controlled to be lower as the difference data Dif1 is smaller. With regard to a frame image with a small difference data Dif1, namely, a dark frame image, the brightness of the back light 8 is controlled to be lower by the back light brightness adjustment circuit 26 and the gamma value is controlled to be smaller by the correction point data calculation circuit 13B and the approximate operation and correction circuit 14. Since the brightness of the back light 8 is set smaller and the display image is made brighter when the dark frame image is displayed, it is possible to reduce the electric power consumption without deterioration of the picture quality.

4. Fourth Embodiment

Figure 11:
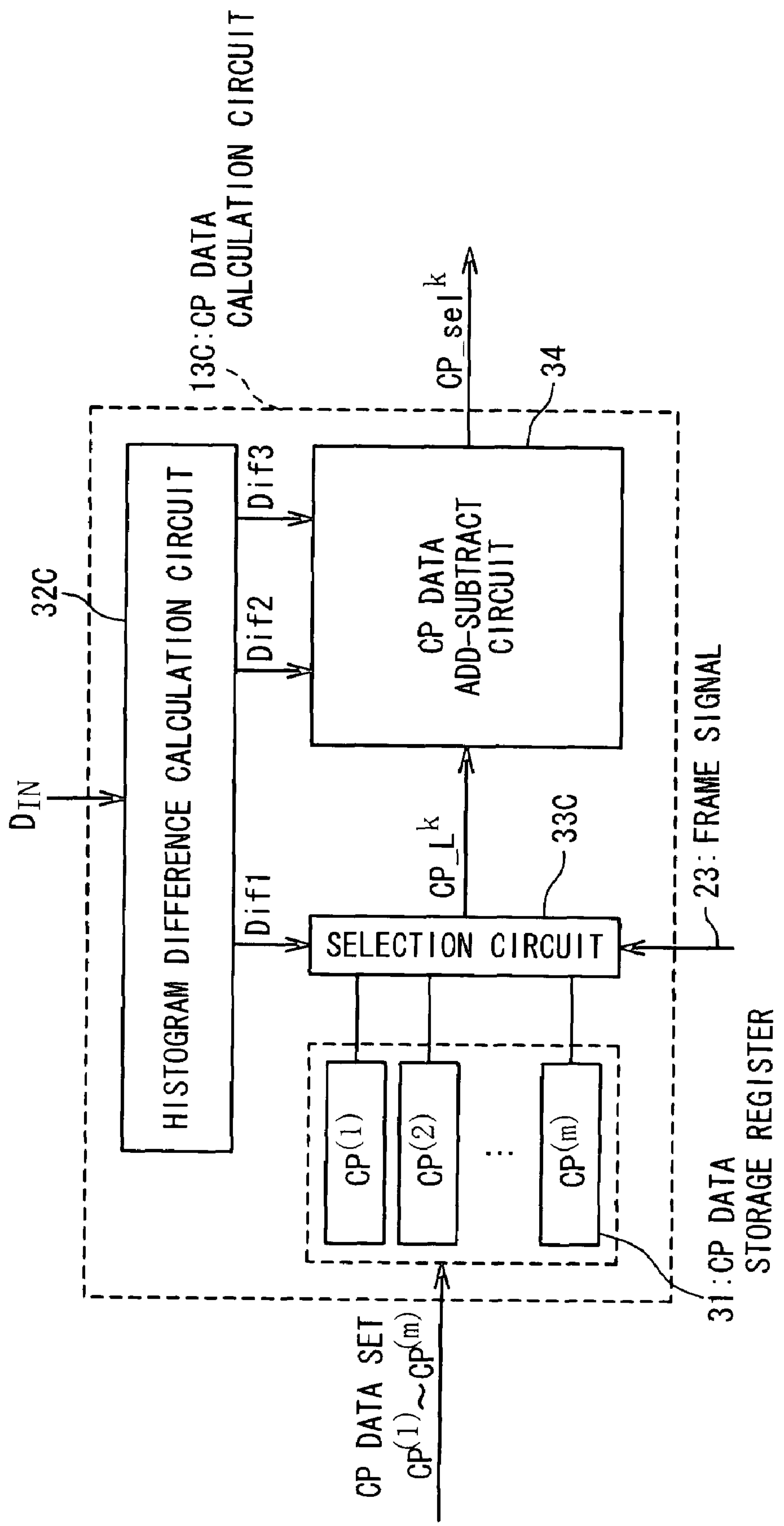
FIG. 11 is a block diagram showing a configuration of a correction point data calculation circuit in a fourth embodiment.

According to the fourth embodiment, not only the gamma value $\gamma$ is switched depending on the frequency distribution of the input gray-scale data but also the correction point data CP0 to CP5 are modified depending on the frequency distribution of the input gray-scale data, and thereby the contrast of the image can be controlled more preferably. As described above, the correction point data CP0 to CP5 are basically determined by the equation (1a) or (1b). In the fourth embodiment, the correction point data CP1 and CP4 out of the correction point data CP0 to CP5 determined by the equation (1a) or (1b) are modified in accordance with the frequency distribution of the input gray-scale data, and thereby the contrast of the image is controlled more suitably. For the purpose of switching the gamma value $\gamma$ and further modifying the correction point data CP1 and CP4 depending on the frequency distribution of the input gray-scale data, a correction point data calculation circuit 13C shown in FIG. 11 is used in the fourth embodiment instead of the correction point data calculation circuit 13 shown in FIG. 2.

The correction point data calculation circuit 13C is provided with the correction point data storage register 31, a histogram difference calculation circuit 32C, a selection circuit 33C and a correction point data add-subtract circuit 34.

The correction point data storage register 31 stores the m correction point data sets $CP^{(1)}$~$CP^{(m)}$. The histogram difference calculation circuit 32C calculates a frequency distribution of the input gray-scale data of each frame image and generates difference data Dif1, Dif2 and Dif3 on the basis of the calculated frequency distribution. The details of the difference data Dif1, Dif2 and Dif3 will be described later. The selection circuit 33C selects correction point data sets $CP\_L^R$, $CP\_L^G$ and $CP\_L^B$ from the correction point data sets $CP^{(1)}$~$CP^{(m)}$ depending on the difference data Dif1, and supplies the selected correction point data sets $CP\_L^R$, $CP\_L^G$ and $CP\_L^B$ to the correction point data add-subtract circuit 34. Any of the selected correction point data sets $CP\_L^R$, $CP\_L^G$ and $CP\_L^B$ is a data set composed of the correction point data CP0 to CP5. The correction point data add-subtract circuit 34 modifies the correction point data CP1 and CP4 of the selected correction point data sets $CP\_L^R$, $CP\_L^G$ and $CP\_L^B$ depending on the difference data Dif2 and Dif3 output from the histogram difference calculation circuit 32C, to generate the selected correction point data sets $CP\_sel^R$, $CP\_sel^G$ and $CP\_sel^B$ to be supplied to the approximate operation and correction circuit 14. It should be noted that the selected correction point data sets $CP\_L^R$, $CP\_L^G$ and $CP\_L^B$ output from the selection circuit 33C are not necessarily identical to the respective selected correction point data sets $CP\_sel^R$, $CP\_sel^G$ and $CP\_sel^B$ transmitted to the approximate operation and correction circuit 14, although the selected correction point data sets $CP\_L^R$, $CP\_L^G$ and $CP\_L^B$ correspond to the respective selected correction point data sets $CP\_sel^R$, $CP\_sel^G$ and $CP\_sel^B$.

Figure 13A:
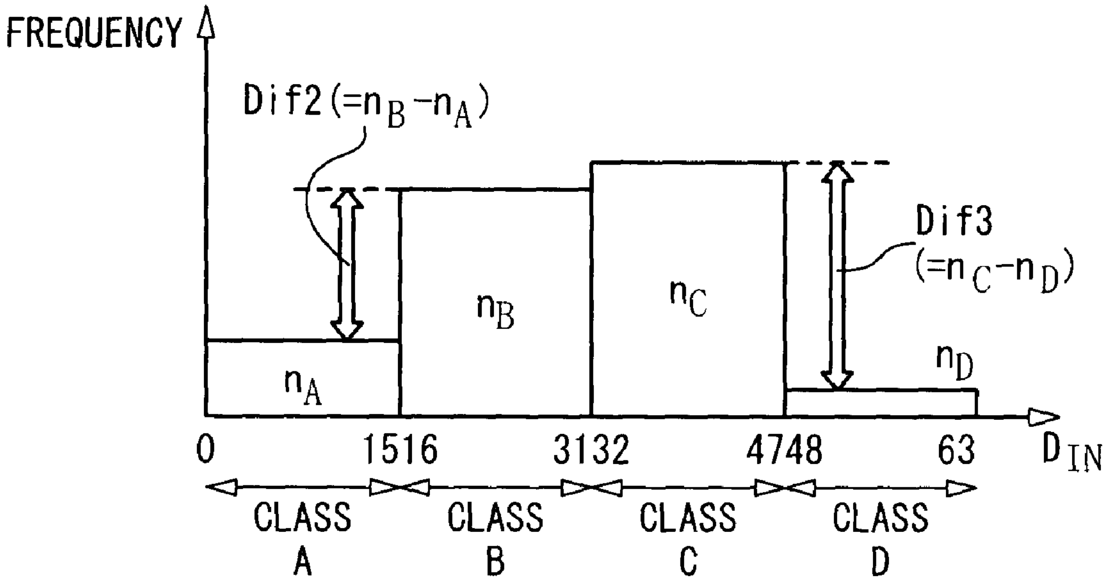
FIG. 13A is a graph for explaining difference data Dif2 and Dif3 in the fourth embodiment.
Figure 13B:
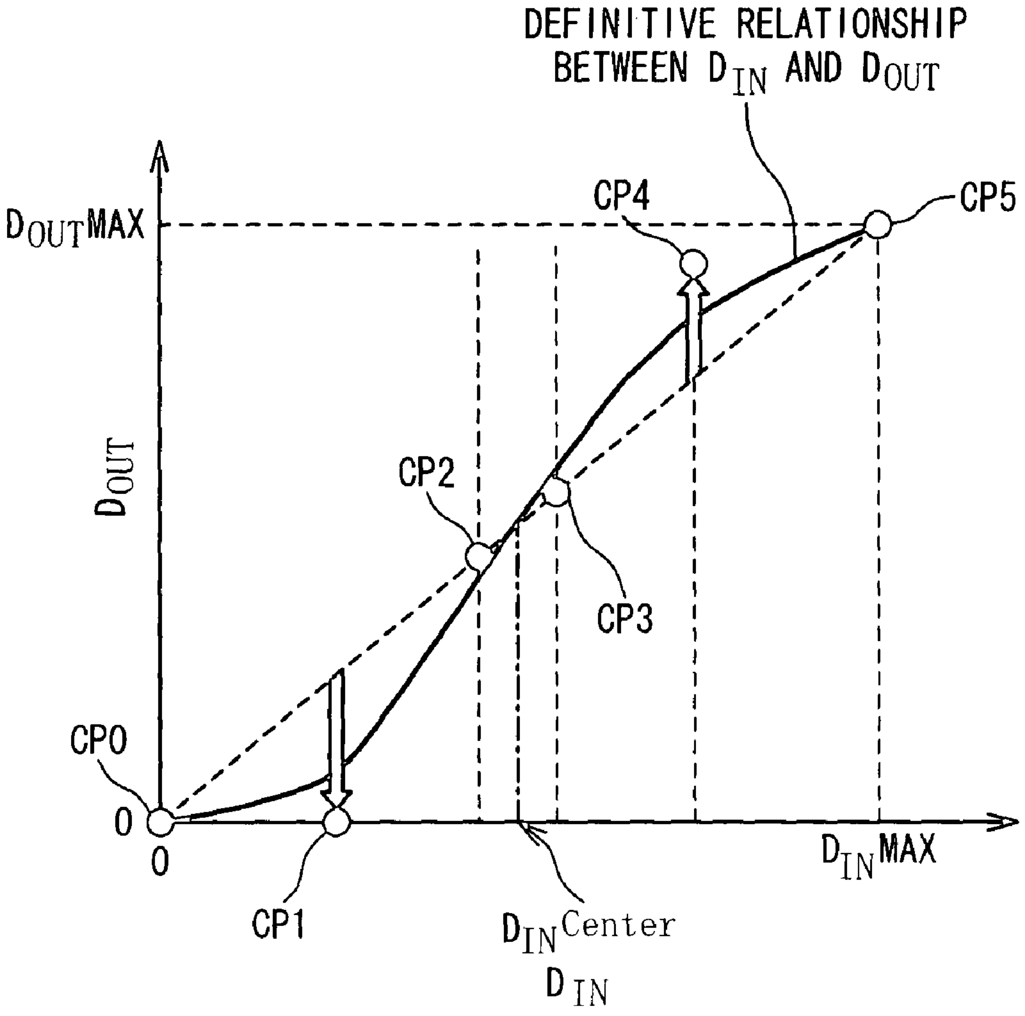
FIG. 13B is a graph representing a definitive relationship between input gray-scale data and output gray-scale data that is obtained depending on the difference data Dif2 and Dif3.
Figure 14:
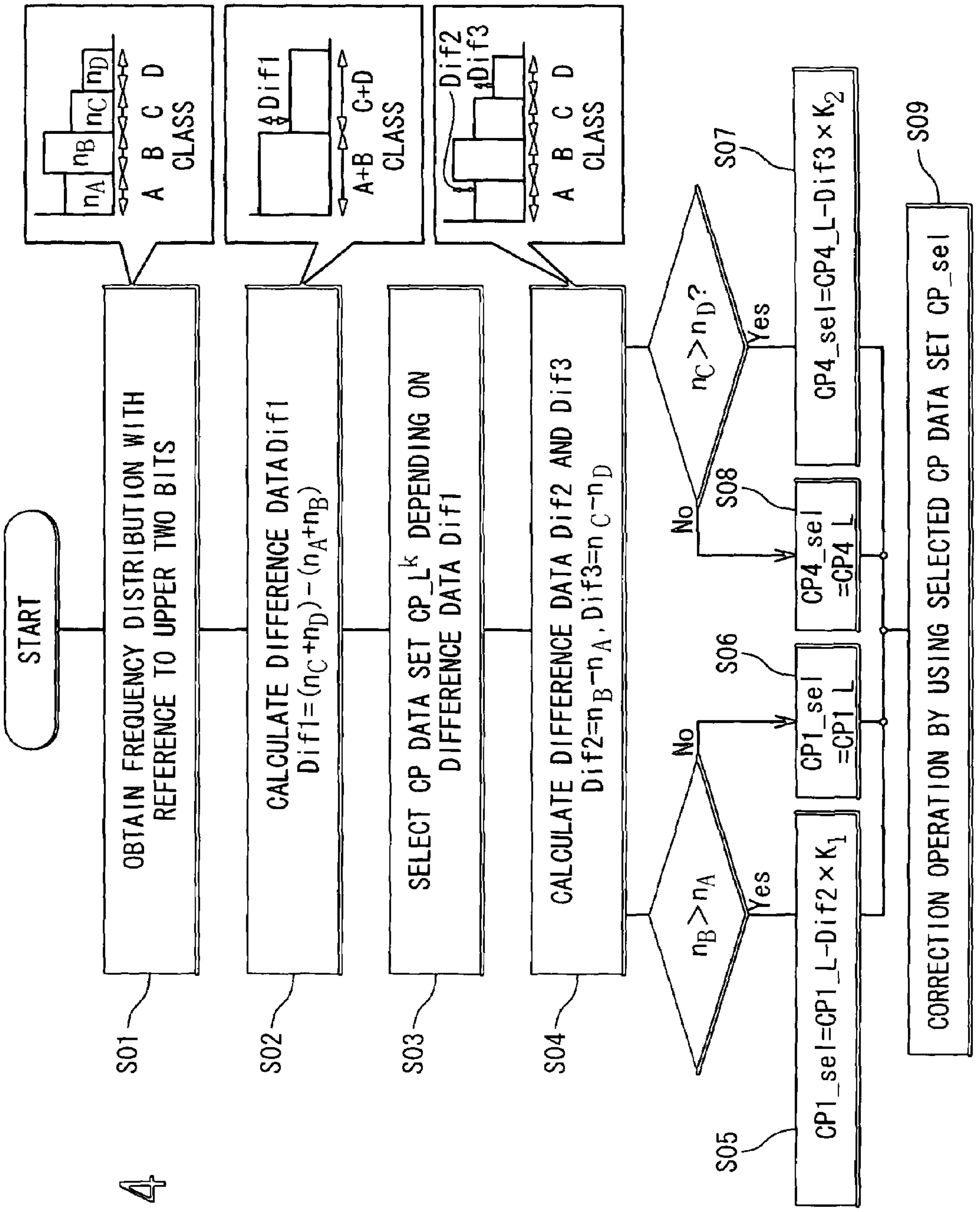
FIG. 14 is a flowchart showing an operation of the liquid crystal display device in the fourth embodiment.

FIG. 12A to FIG. 14 are diagrams for explaining the details of operations of the histogram difference calculation circuit 32C, the selection circuit 33C and the correction point data add-subtract circuit 34. With reference to FIG. 14, the histogram difference calculation circuit 32C obtains a frequency distribution of the input gray-scale data (Step S01). In the present embodiment, the histogram difference calculation circuit 32C classifies a range of values of the input gray-scale data $D_{IN}$ into four classes "A" to "D", and calculates frequencies (the numbers of times) of respective classes "A" to "D". Here, the class "A" corresponds to a range that is lower than the quarter of the maximum value $D_{IN}^{MAX}$ of the input gray-scale data. The class "B" corresponds to a range that is equal to or higher than the quarter and lower than the half of the maximum value $D_{IN}^{MAX}$ of the input gray-scale data. The class "C" corresponds to a range that is equal to or higher than the half and lower than the three-quarter of the maximum value $D_{IN}^{MAX}$ of the input gray-scale data. The class "D" corresponds to a range that is equal to or higher than the three-quarter of the maximum value $D_{IN}^{MAX}$ of the input gray-scale data.

To which of the classes "A" to "D" each input gray-scale data belongs can be determined by referring to the upper two bits of the input gray-scale data. More specifically, when the upper two bits of the input gray-scale data are "00", "01", "10" and "11", the histogram difference calculation circuit 32C determines that the input gray-scale data belongs to the classes "A", "B", "C" and "D", respectively.

Figure 12A:
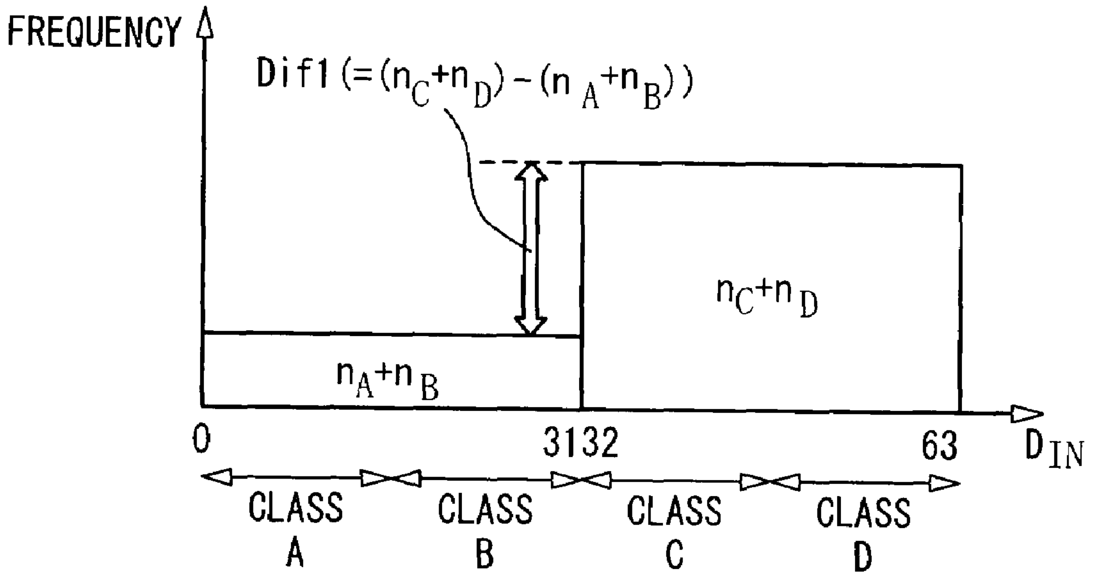
FIG. 12A is a graph for explaining a difference data Dif1 in the fourth embodiment.

Furthermore, the histogram difference calculation circuit 32C calculates a difference data Dif1 based on frequencies $n_A$, $n_B$, $n_C$ and $n_D$ of the respective classes "A", "B", "C" and "D" (Step S02). More specifically, as shown in FIG. 12A, the histogram difference calculation circuit 32C calculates the difference data Dif1 in accordance with the following equation:

$$\mathrm{Dif1}=(n_C+n^D)-(n_A+n_B).$$

The difference data Dif1 thus calculated represents the brightness as a whole of the frame image. In a case where the frame image is bright as a whole, the frequencies of the classes "C" and "D" become high and hence the difference data Dif1 is increased. Conversely, in a case where the frame image is dark as a whole, the frequencies of the classes "A" and "B" become high and hence the difference data Dif1 is decreased. The difference data Dif1 thus calculated is transmitted to the selection circuit 33C.

Figure 12B:
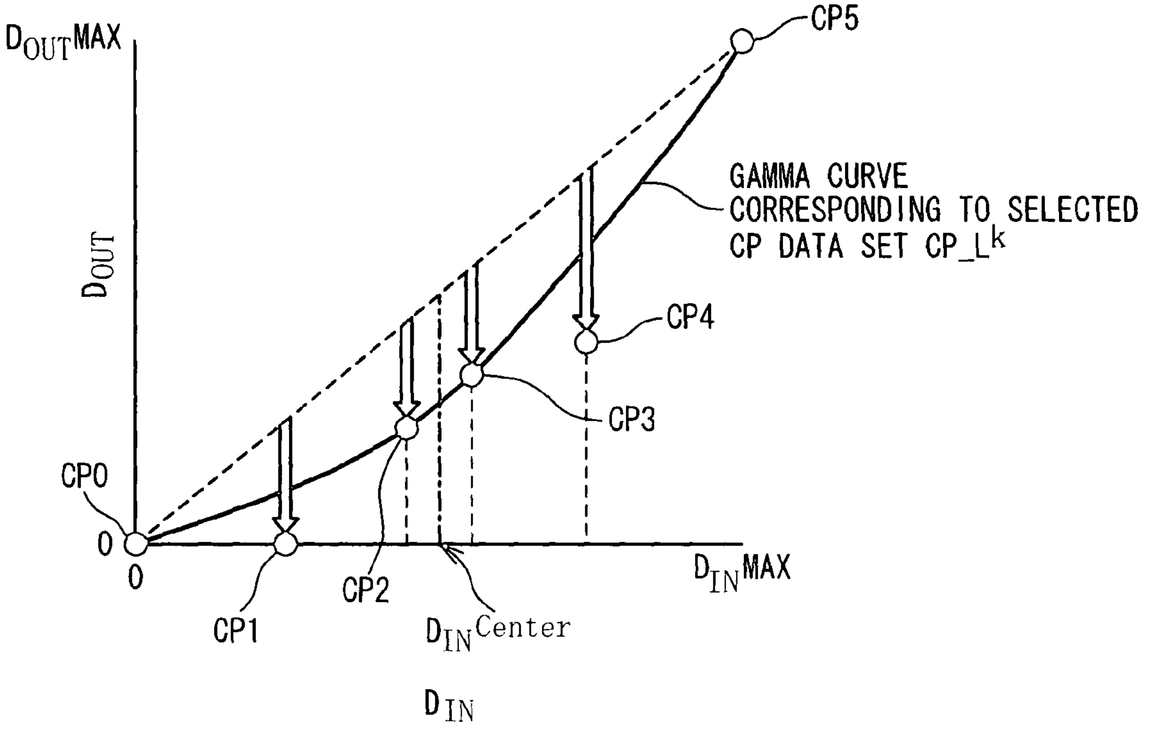
FIG. 12B is a graph showing a gamma curve corresponding to a selected correction point data set $CP\_L^k$ selected depending on the difference data Dif1 in the fourth embodiment.

The selection circuit 33C selects the selected correction point data sets $CP\_L^R$, $CP\_L^G$ and $CP\_L^B$ from the correction point data sets $CP^{(1)}$~$CP^{(m)}$, depending on the difference data Dif1 (Step S03). As shown in FIG. 12B, a shape of the gamma curve of the correction operation performed by the approximate operation and correction circuit 14 is provisionally determined by the selected correction point data sets $CP\_L^R$, $CP\_L^G$ and $CP\_L^B$. As the calculated difference data Dif1 is smaller, the selection circuit 33C selects a correction point data set $CP^{(i)}$ corresponding to the smaller gamma value $\gamma$ as the selected correction point data set $CP\_L^k$. As a result, when the frame image is dark on the whole and its contrast is not clear, the contrast is enhanced and hence excellent picture quality can be obtained.

As shown in FIG. 14, the histogram difference calculation circuit 32C calculates difference data Dif2 and Dif3 based on the frequencies $n_A$, $n_B$, $n_C$ and $n_D$ of the respective classes "A", "B", "C" and "D" (Step S04). More specifically, as shown in FIG. 13A, the histogram difference calculation circuit 32C calculates the difference data Dif2 and Dif 3 in accordance with the following equation:

$$\mathrm{Dif2}=n_B-n_A, \tag{11a}$$

$$\mathrm{Dif3}=n_C-n_D. \tag{11b}$$

The difference data Dif2 is a data representing a distribution of the input gray-scale data in the side of dark gray-scale, while the difference data Dif3 is a data representing a distribution of the input gray-scale data in the side of bright gray-scale. The fact that the difference data Dif2 and Dif3 are large means that the distribution of the input gray-scale data concentrates in the vicinity of the intermediate data value $D_{IN}^{Center}$ and the displayed frame image lacks the contrast.

The correction point data add-subtract circuit 34 modifies the correction point data CP1 and CP4 of the selected correction point data set $CP\_L^k$, depending on the difference data Dif2 and Dif3 calculated by the histogram difference calculation circuit 32C, and thereby the contrast is adjusted. Specifically, in a case where the frequency $n_B$ of the class "B" is larger than the frequency $n_A$ of the class "A" (namely, in a case where the difference data Dif2 is positive), the correction point data add-subtract circuit 34 modifies the correction point data CP1 of the selected correction point data set $CP\_L^k$ to obtain the correction point data CP1 of the selected correction point data set $CP\_sel^k$ (Step S05). More specifically, the correction point data CP1 of the selected correction point data set $CP\_sel^k$ is calculated by the following equation (12):

$$CP1\_\mathrm{sel}=CP1\_L-\mathrm{Dif2}\times K_1, \tag{12}$$

here, the CP1_sel in the equation (12) is the correction point data CP1 of the selected correction point data set $CP\_sel^k$ and the CP1_L is the correction point data CP1 of the selected correction point data set $CP\_L^k$. The parameter $K_1$ is a constant representing the degree of the adjustment of the contrast. On the other hand, in a case where the frequency $n_B$ of the class "B" is equal to or smaller than the frequency $n_A$ of the class "A", the correction point data CP1 of the selected correction point data set $CP\_L^k$ is not modified. That is, the correction point data CP1 of the selected correction point data set $CP\_sel^k$ is set to the same as the correction point data CP1 of the selected correction point data set $CP\_L^k$ (Step S06).

Moreover, in a case where the frequency $n_C$ of the class "C" is larger than the frequency $n_D$ of the class "D" (namely, in a case where the difference data Dif3 is positive), the correction point data add-subtract circuit 34 modifies the correction point data CP4 of the selected correction point data set $CP\_L^k$ to obtain the correction point data CP4 of the selected correction point data set $CP\_sel^k$ (Step S07). More specifically, the correction point data CP4 of the selected correction point data set $CP\_sel^k$ is calculated by the following equation (13):

$$CP4\_\mathrm{sel}=CP4\_L-\mathrm{Dif3}\times K_2, \tag{13}$$

here, the CP4_sel in the equation (13) is the correction point data CP4 of the selected correction point data set $CP\_sel^k$ and the CP4_L is the correction point data CP4 of the selected correction point data set $CP\_L^k$. The parameter $K_2$ is a constant representing the degree of the adjustment of the contrast. On the other hand, in a case where the frequency $n_C$ of the class "C" is equal to or smaller than the frequency $n_D$ of the class "D", the correction point data CP4 of the selected correction point data set $CP\_L^k$ is not modified. That is, the correction point data CP4 of the selected correction point data set $CP\_sel^k$ is set to the same as the correction point data CP4 of the selected correction point data set $CP\_L^k$ (Step S08).

As described above, the correction point data CP0, CP2, CP3 and CP4 of the selected correction point data set $CP\_sel^k$ are the same as the correction point data CP0, CP2, CP3 and CP4 of the selected correction point data set $CP\_L^k$.

Furthermore, the correction point data add-subtract circuit 34 transmits the correction point data CP0 to CP5 of the selected correction point data set $CP\_sel^k$ to the approximate operation and correction circuit 14 (Step S09). The approximate operation and correction circuit 14 performs the correction operation with respect to the input gray-scale data $D_{IN}$, in accordance with the correction point data CP0 to CP5 of the selected correction point data set $CP\_sel^k$.

As described above, the correction point data CP1 and CP4 of the selected correction point data set $CP\_L^k$ determined based on the difference data Dif1 are modified depending on the difference data Dif2 and Dif3, and thus the correction point data CP1 and CP4 of the selected correction point data set $CP\_sel^k$ is determined. As a result, it is possible to control the contrast more suitably. For example, in a case where the difference data Dif2 is large, namely, in a case where the input gray-scale data lacks the contract in the dark gray-scale side, the correction point data CP1 of the selected correction point data set $CP\_sel^k$ is reduced depending on the difference indicated by the difference data Dif2, as shown in FIG. 13B. As a result, the contrast of the image in the dark gray-scale side is enhanced. On the other hand, in a case where the difference data Dif3 is large, namely, in a case where the input gray-scale data lacks the contract in the bright gray-scale side, the correction point data CP4 of the selected correction point data set $CP\_sel^k$ is increased depending on the difference indicated by the difference data Dif3, as shown in FIG. 13B. As a result, the contrast of the image in the bright gray-scale side is enhanced. By determining the correction point data CP1 and CP4 of the selected correction point data set $CP\_sel^k$ in this manner, the contrast can be controlled more suitably.

As in the third embodiment, the controller driver 4 in the fourth embodiment can be provided with a back light brightness adjustment circuit for adjusting the brightness of the back light 8. In this case, the back light brightness adjustment circuit preferably controls the brightness of the back light 8 depending on the difference data Dif1 calculated by the correction point data calculation circuit 13.

According to the LCD device 1 in the foregoing embodiments, the input gray-scale data $D_{IN}$ supplied to the controller driver 4 is stored once in the display memory 12 and thereafter read out from the display memory 12 to the approximate operation and correction circuit 14. According to such a configuration, while the input gray-scale data $D_{IN}$ of a certain frame image is stored in the display memory 12, the correction point data CP0 to CP5 of the selected correction point data set $CP\_sel^k$ used in the correction operation for the input gray-scale data $D_{IN}$ of the certain frame image are calculated.

Figure 16:
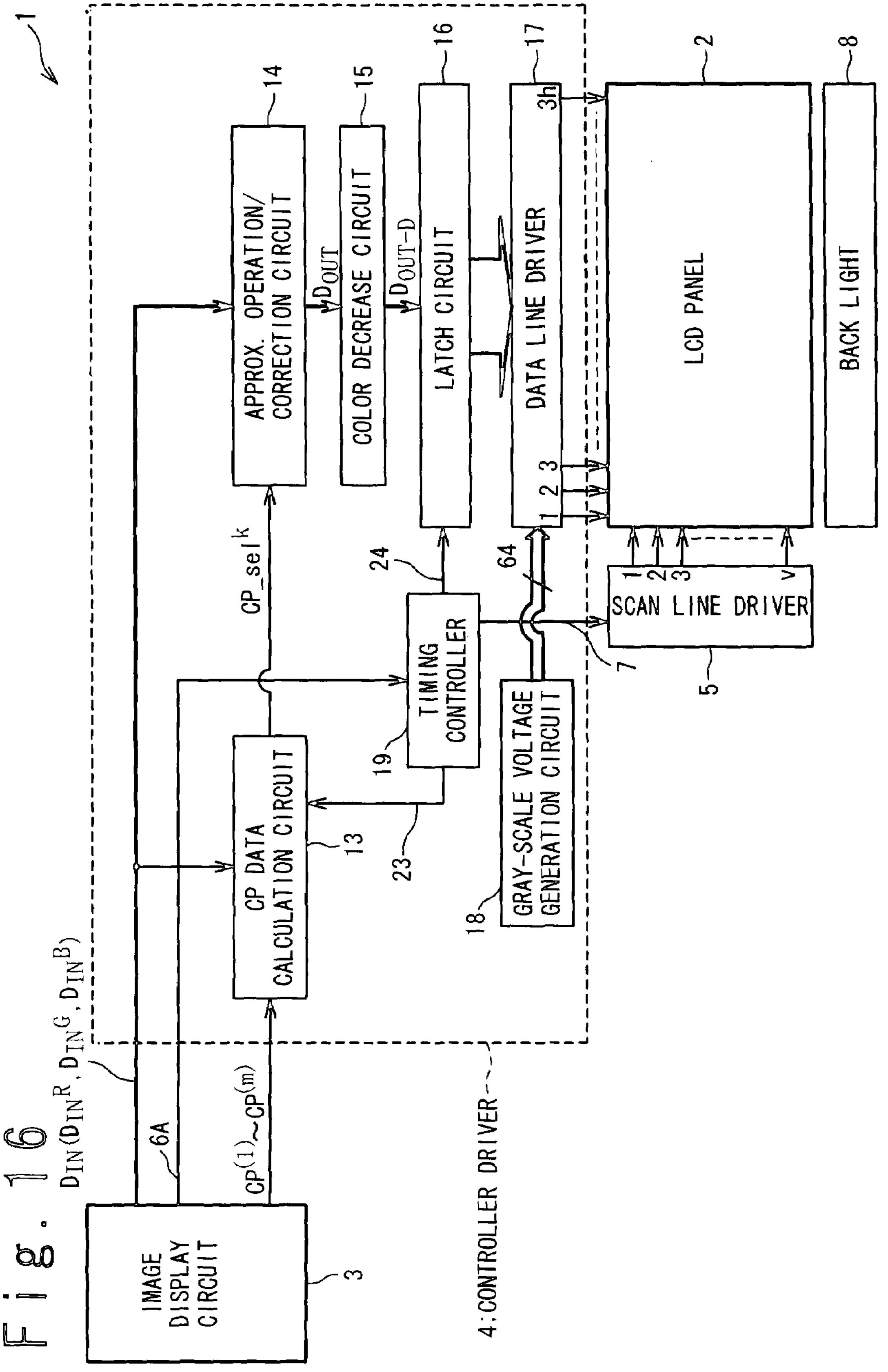
FIG. 16 is a block diagram showing another modified example of the liquid crystal display device according to the first embodiment.

Alternatively, the memory controller 11 and the display memory 12 may be eliminated from the controller driver 4, as shown in FIG. 16. In this case, a synchronizing signal 6A instead of the memory control signal 6 is supplied to the controller driver 4. The synchronizing signal 6A consists of a horizontal synchronizing signal and a vertical synchronizing signal and is supplied to the timing controller 19. The timing controller 19 carries out the timing control of the controller driver 4 in response to the synchronizing signal 6A. It should be noted that illustrated in FIG. 16 is a configuration in which the memory controller 11 and the display memory 12 are eliminated from the controller driver 4 of the LCD device 1 of the first embodiment. Similarly, the memory controller 11 and the display memory 12 can be eliminated from the controller driver 4 of the other embodiments.

In the case where the memory controller 11 and the display memory 12 are eliminated from the controller driver 4, the correction point data CP0 to CP5 of the selected correction point data set $CP\_sel^k$ used in the correction operation of an input gray-scale data $D_{IN}$ of a frame image displayed in the F-th frame period are calculated from an input gray-scale data $D_{IN}$ of a frame image displayed in the precedent (F-1)-th frame. Since there is not much difference in brightness and contrast between the frame images of adjacent frames in many cases, it is of no matter that the correction operation of the input gray-scale data $D_{IN}$ of a target frame image is performed by using the selected correction point data set $CP\_sel^k$ calculated from the input gray-scale data $D_{IN}$ of the precedent frame image.

More specifically, in the case where the display memory 12 is eliminated from the controller driver 4 of the first or the second embodiment, the APL is calculated from the input gray-scale data $D_{IN}$ of the frame image displayed in the (F−1)-th frame, and the selected correction point data set $CP\_sel^k$ is calculated based on the APL. The obtained selected correction point data set $CP\_sel^k$ is used in the correction operation of the input gray-scale data $D_{IN}$ of the frame image to be displayed in the F-th frame.

On the other hand, in the case where the display memory 12 is eliminated from the controller driver 4 of the third or the fourth embodiment, the difference data Dif1 (or the difference data Dif1 to Dif3) is calculated from the input gray-scale data $D_{IN}$ of the frame image displayed in the (F−1)-th frame, and the selected correction point data set $CP\_sel^k$ is calculated based on the difference data. The obtained selected correction point data set $CP\_sel^k$ is used in the correction operation of the input gray-scale data $D_{IN}$ of the frame image to be displayed in the F-th frame.

In the foregoing embodiments, the liquid crystal display device using the LCD panel is described as an example. However, the present invention is not limited to that. It is obvious to a person skilled in the art that the present invention is also applicable to a display device using another display panel such as a plasma display panel (PDP) or the like.

It is apparent that the present invention is not limited to the above embodiments and may be modified and changed without departing from the scope and spirit of the invention.

What is claimed is:

1. A display device, comprising:

a display panel;

an operation and correction circuit configured to perform a correction operation with respect to an input gray-scale data of a target frame image by using an arithmetic expression to generate an output gray-scale data;

a driver configured to drive said display panel in accordance with said output gray-scale data; and a correction data calculation circuit configured to generate a correction data that specifies a relationship between said input gray-scale data and said output gray-scale data of said target frame image, depending on said input gray scale data of said target frame image or an input gray-scale data of a precedent frame image followed by said target frame image, wherein said operation and correction circuit determines coefficients of said arithmetic expression from said correction data, and wherein said arithmetic expression is switched between a plurality of arithmetic expressions in response to said input gray-scale data and said correction data.

2. The display device according to claim 1, wherein said operation and correction circuit is configured to perform a gamma correction based on an approximate expression, wherein said correction data includes a correction point data set comprising correction point data that specifies a shape of a gamma curve of said gamma correction, and wherein said operation and correction circuit determines coefficients of said approximate expression from said correction point data set.

3. The display device according to claim 2, wherein said correction data calculation circuit comprises:

a storage circuit configured to store a plurality of correction point data sets corresponding to different gamma values; and a selection circuit configured to select said correction point data set supplied to said operation and correction circuit from said plurality of correction point data sets, depending on said input gray-scale data of said target frame image or said input gray-scale data of said precedent frame image followed by said target frame image.

4. The display device according to claim 2, wherein said correction data calculation circuit calculates an Average Picture Level (APL) from said input gray-scale data of said target frame image or said precedent frame image and calculates said correction point data set supplied to said operation and correction circuit based on said calculated APL.

5. The display device according to claim 4, wherein said correction data calculation circuit comprises:

a storage circuit configured to store a plurality of correction point data sets corresponding to different gamma values; and a selection circuit configured to select said correction point data set supplied to said operation and correction circuit from said plurality of correction point data sets, depending on said calculated APL.

6. The display device according to claim 4, wherein said correction data calculation circuit comprises:

a storage circuit configured to store a plurality of correction point data sets; and an interpolation operation and selection circuit configured to select two correction point data sets from said plurality of correction point data sets depending on upper bits of said calculated APL and to generate said correction point data set supplied to said operation and correction circuit by interpolating said two correction point data sets depending on lower bits of said calculated APL.

7. The display device according to claim 4, wherein said display panel comprises a liquid crystal display, and wherein the display device further comprises:

a back light configured to illuminate said liquid crystal display panel; and a back light brightness adjustment circuit configured to control a brightness of said back light depending on said calculated APL.

8. The display device according to claim 2, wherein said correction data calculation circuit calculates a frequency distribution of said input gray-scale data of said target frame image or said precedent frame image, and calculates said correction point data set supplied to said operation and correction circuit based on said calculated frequency distribution.

9. The display device according to claim 8, wherein said correction data calculation circuit calculates a frequency of a first class corresponding to a range in which a value of said input gray-scale data is relatively low and a frequency of a second class corresponding to a range in which a value of said input gray-scale data is relatively high, and wherein said correction data calculation circuit calculates said correction point data set supplied to said operation and correction circuit depending on a difference in said frequency between said first class and said second class.

10. The display device according to claim 9, wherein said correction data calculation circuit comprises:

a storage circuit configured to store a plurality of correction point data sets corresponding to different gamma values; and a selection circuit configured to select said correction point data set supplied to said operation and correction circuit from said plurality of correction point data sets, depending on said difference in said frequency between said first class and said second class.

11. The display device according to claim 9, wherein said display panel comprises a liquid crystal display panel, and wherein the display device further comprises:

a back light configured to illuminate said liquid crystal display panel; and a back light brightness adjustment circuit configured to control a brightness of said back light depending on said difference in said frequency between said first class and said second class.

12. The display device according to claim 2, wherein said correction data calculation circuit comprises:

a frequency distribution calculation circuit configured to calculate a frequency distribution of said input gray-scale data of said target frame image or said precedent frame image;

a storage circuit configured to store a plurality of correction point data sets corresponding to different gamma values;

a selection circuit configured to select a selected correction point data set from said plurality of correction point data sets, depending on said calculated frequency distribution; and a correction point data operation circuit configured to modify correction point data included in said selected correction point data set, depending on said calculated frequency distribution, wherein said correction point data operation circuit determines said selected correction point data set including said modified correction point data as said correction point data set supplied to said operation and correction circuit.

13. The display device according to claim 12, wherein each of said plurality of correction point data sets stored in said storage circuit includes correction point data CP0 to CP5 defined by the following equation (1a) in a case where the corresponding gamma value $\gamma$ is smaller than 1 or defined by the following equation (1b) in a case where the corresponding gamma value $\gamma$ is larger than 1:

$$CP0 = 0, \tag{1a}$$

$$CP1 = \frac{4 \cdot \text{Gamma}[K/4] - \text{Gamma}[K]}{2},$$

$$CP2 = \text{Gamma}[K-1],$$

$$CP3 = \text{Gamma}[K],$$

$$CP4 = 2 \cdot \text{Gamma}[(D_{IN}^{MAX} + K - 1)/2] - D_{OUT}^{MAX},$$

$$CP5 = D_{OUT}^{MAX},$$

$CP0=0,$ $CP1=2\cdot\text{Gamma}[K/2]-\text{Gamma}[K],$ $CP2=\text{Gamma}[K-1],$ $CP3=\text{Gamma}[K],$ $CP4=2\cdot\text{Gamma}[(D_{IN}^{MAX}+K-1)/2]-D_{OUT}^{MAX},$ $$CP5=D_{OUT}^{MAX}, \tag{1b}$$

wherein said Gamma[x] is a function representing an accurate expression of said gamma correction and is expressed by the following equation (2):

$$\text{Gamma}[x]=D_{OUT}^{MAX}\cdot(x/D_{IN}^{MAX})^{\gamma}, \tag{2}$$

wherein said frequency distribution calculation circuit calculates a frequency of a first class corresponding to a quarter range in which a value of said input gray-scale data is lowest, a frequency of a second class corresponding to a quarter range in which a value of said input gray-scale data is relatively higher than that of said first class, a frequency of a third class corresponding to a quarter range in which a value of said input gray-scale data is relatively higher than that of said second class, and a frequency of a fourth class corresponding to a quarter range in which a value of said input gray-scale data is relatively higher than that of said third class and is highest, wherein said selection circuit selects said selected correction point data set from said plurality of correction point data sets stored in said storage circuit, depending on a difference between a sum of said frequency of said first class and said frequency of said second class and a sum of said frequency of said third class and said frequency of said fourth class, wherein said correction point data operation circuit modifies said correction point data CP1 of said selected correction point data set depending on a difference in said frequency between said first class and said second class, and modifies said correction point data CP4 of said selected correction point data set depending on a difference in said frequency between said third class and said fourth class, wherein when said input gray-scale data is expressed by $D_{IN}$ and said output gray-scale data is expressed by $D_{OUT}$, said operation and correction circuit calculates said output gray-scale data based on said selected correction point data set including said modified correction point data CP1 and CP4, in accordance with the following equations (3a) to (3c):

(1) in a case where $D_{IN}<D_{IN}^{Center}$ and CP1>CP0:

$$D_{OUT}=\frac{2(CP1-CP0)\cdot PD_{INS}}{K^2}+\frac{(CP3-CP0)D_{INS}}{K}+CP0. \tag{3a}$$

(2) in a case where $D_{IN}<D_{IN}^{Center}$ and CP1<CP0:

$$D_{OUT}=\frac{2(CP1-CP0)\cdot ND_{INS}}{K^2}+\frac{(CP3-CP0)D_{INS}}{K}+CP0. \tag{3b}$$

(3) in a case where $D_{IN}>D_{IN}^{Center}$:

$$D_{OUT}=\frac{2(CP4-CP2)\cdot ND_{INS}}{K^2}+\frac{(CP5-CP2)D_{INS}}{K}+CP2. \tag{3c}$$

wherein said K is expressed by the following equation (4):

$$K=(D_{IN}^{MAX}+1)/2, \tag{4}$$

said $D_{IN}^{Center}$ is expressed by the following equation (5):

$$D_{IN}^{Center}=D_{IN}^{MAX}/2, \tag{5}$$

a parameter R is given by the following equation (6):

$$R=K^{1/2}\times D_{INS}^{1/2}, \tag{6}$$

said $D_{INS}$, said $PD_{INS}$ and said $ND_{INS}$ are given by the following equations (7a) to (7d):

$$D_{INS}=D_{IN},\ (\text{in a case of } D_{IN}<D_{IN}^{Center}) \tag{7a}$$

$$D_{INS}=D_{IN}+1-K,\ (\text{in a case of } D_{IN}>D_{IN}^{Center}) \tag{7b}$$

$$PD_{INS}=(K-R)\times R, \tag{7c}$$

$$ND_{INS}=(K-D_{INS})\times D_{INS}. \tag{7d}$$

14. The display device according to claim 13, wherein said display panel comprises a liquid crystal display panel, and wherein the display device further comprises:

a back light configured to illuminate said liquid crystal display panel; and a back light brightness adjustment circuit configured to control a brightness of said back light depending on said difference between said sum of said frequency of said first class and said frequency of said second class and said sum of said frequency of said third class and said frequency of said fourth class.

15. The display device according to claim 2, wherein when a maximum value of said input gray-scale data is $D_{IN}^{MAX}$ and a maximum value of said output gray-scale data is $D_{ouT}^{MAX}$, said correction point data set generated by said correction data calculation circuit includes correction point data CP0 to CP5 defined by the following equation (1a) or (1b):

$$CP0=0, \tag{1a}$$

$$CP1=\frac{4\cdot\text{Gamma}[K/4]-\text{Gamma}[K]}{2},$$

$$CP2=\text{Gamma}[K-1],$$

$$CP3=\text{Gamma}[K],$$

$$CP4=2\cdot\text{Gamma}[(D_{IN}^{MAX}+K-1)/2]-D_{OUT}^{MAX},$$

$$CP5=D_{OUT}^{MAX},$$

$CP0=0,$ $CP1=2\cdot\text{Gamma}[K/2]-\text{Gamma}[K],$ $CP2=\text{Gamma}[K-1],$ $CP3=\text{Gamma}[K],$ $CP4=2\cdot\text{Gamma}[(D_{IN}^{MAX}+K-1)/2]-D_{OUT}^{MAX},$ $$CP5=D_{OUT}^{MAX}, \tag{1b}$$

wherein said Gamma[x] is a function representing an accurate expression of said gamma correction, and when a gamma value corresponding to said correction point data set generated by said correction data calculation circuit is γ, said Gamma[x] is expressed by the following equation (2):

$$\text{Gamma}[x]=D_{OUT}^{MAX}\cdot(x/D_{IN}^{MAX})^{\gamma}, \quad (2)$$

wherein when said input gray-scale data is expressed by $D_{IN}$ and said output gray-scale data is expressed by $D_{OUT}$, said operation and correction circuit calculates said output gray-scale data in accordance with the following equations (3a) to (3c):

(1) in a case where $D_{IN}<D_{IN}^{Center}$ and CP1>CP0:

$$D_{OUT}=\frac{2(CP1-CP0)\cdot PD_{INS}}{K^2}+\frac{(CP3-CP0)D_{INS}}{K}+CP0. \quad (3a)$$

(2) in a case where $D_{IN}<D_{IN}^{Center}$ and CP1<CP0:

$$D_{OUT}=\frac{2(CP1-CP0)\cdot ND_{INS}}{K^2}+\frac{(CP3-CP0)D_{INS}}{K}+CP0. \quad (3b)$$

(3) in a case where $D_{IN}>D_{IN}^{Center}$:

$$D_{OUT}=\frac{2(CP4-CP2)\cdot ND_{INS}}{K^2}+\frac{(CP5-CP2)D_{INS}}{K}+CP2. \quad (3c)$$

wherein said K is expressed by the following equation (4):

$$K=(D_{IN}^{MAX}+1)/2, \quad (4)$$

said $D_{IN}^{Center}$ is expressed by the following equation (5):

$$D_{IN}^{Center}=D_{IN}^{MAX}/2, \quad (5)$$

a parameter R is given by the following equation (6):

$$R=K^{1/2}\times D_{INS}^{1/2}, \quad (6)$$

said $D_{INS}$, said $PD_{INS}$ and said $ND_{INS}$ are given by the following equations (7a) to (7d):

$$D_{INS}=D_{IN}, \text{ (in a case of } D_{IN}<D_{IN}^{Center}) \quad (7a)$$

$$D_{INS}=D_{IN}+1-K, \text{ (in a case of } D_{IN}>D_{IN}^{Center}) \quad (7b)$$

$$PD_{INS}=(K-R)\times R, \quad (7c)$$

$$ND_{INS}=(K-D_{INS})\times D_{INS}. \quad (7d)$$

16. A display panel driver, comprising:

an operation and correction circuit configured to perform a correction operation with respect to an input gray-scale data of a target frame image by using an arithmetic expression to generate an output gray-scale data;

a driver configured to drive a display panel in accordance with said output gray-scale data; and a correction data calculation circuit configured to generate a correction data that specifies a relationship between said input gray-scale data and said output gray-scale data of said target frame image, depending on said input gray-scale data of said target frame image or an input gray-scale data of a precedent frame image followed by said target frame image, wherein said operation and correction circuit determines coefficients of said arithmetic expression from said correction data, and wherein said arithmetic expression is switched between a plurality of arithmetic expressions in response to said input gray-scale data and said correction data.

17. The display panel driver according to claim 16, wherein said operation and correction circuit is configured to perform a gamma correction based on an approximate expression, wherein said correction data includes a correction point data set composed of correction point data that specifies a shape of a gamma curve of said gamma correction, and wherein said operation and correction circuit determines coefficients of said approximate expression from said correction point data set.

18. The display panel driver according to claim 17, wherein said correction data calculation circuit comprises:

a storage circuit configured to store a plurality of correction point data sets corresponding to different gamma values; and a selection circuit configured to select said correction point data set supplied to said operation and correction circuit from said plurality of correction point data sets, depending on said input gray-scale data of said target frame image or said input gray-scale data of said precedent frame image followed by said target frame image.

19. The display panel driver according to claim 17, wherein said correction data calculation circuit calculates an APL from said input gray-scale data of said target frame image or said precedent frame image and calculates said correction point data set supplied to said operation and correction circuit based on said calculated APL.

20. The display panel driver according to claim 17, wherein said correction data calculation circuit calculates a frequency distribution of said input gray-scale data of said target frame image or said precedent frame image, and calculates said correction point data set supplied to said operation and correction circuit based on said calculated frequency distribution.

21. The display panel driver according to claim 17, wherein said correction data calculation circuit comprises:

a frequency distribution calculation circuit configured to calculate a frequency distribution of said input gray-scale data of said target frame image or said precedent frame image;

a storage circuit configured to store a plurality of correction point data sets corresponding to different gamma values;

a selection circuit configured to select said correction point data set supplied to said operation and correction circuit from said plurality of correction point data sets, depending on said calculated frequency distribution; and a correction point data operation circuit configured to modify correction point data included in said selected correction point data set, depending on said calculated frequency distribution.

22. A method of driving a display panel, said method comprising:

performing a correction operation with respect to an input gray-scale data of a target frame image by using an arithmetic expression to generate an output gray-scale data;

driving a display panel in accordance with said output gray-scale data; and generating a correction data that specifies a relationship between said input gray-scale data and said output gray-scale data of said target frame image, depending on said input gray-scale data of said target frame image or an input gray-scale data of a precedent frame image followed by said target frame image, wherein coefficients of said arithmetic expression are determined from said correction data, and wherein said arithmetic expression is switched between a plurality of arithmetic expressions in response to said input gray-scale data and said correction data.

* * * * *